United States Patent
Suzuki et al.

(10) Patent No.: US 10,120,503 B2
(45) Date of Patent: Nov. 6, 2018

(54) DISPLAY DEVICE AND METHOD OF DRIVING THE SAME

(71) Applicant: Japan Display Inc., Tokyo (JP)

(72) Inventors: Takafumi Suzuki, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/488,645

(22) Filed: Apr. 17, 2017

(65) Prior Publication Data
US 2017/0315671 A1 Nov. 2, 2017

(30) Foreign Application Priority Data
May 2, 2016 (JP) .................. 2016-092598

(51) Int. Cl.
*G06F 3/041* (2006.01)
*G06F 3/044* (2006.01)
*G09G 3/36* (2006.01)

(52) U.S. Cl.
CPC ............ *G06F 3/0418* (2013.01); *G06F 3/044* (2013.01); *G06F 3/0412* (2013.01); *G09G 3/3648* (2013.01); *G09G 3/3611* (2013.01); *G09G 2354/00* (2013.01)

(58) Field of Classification Search
CPC ......... F04B 33/00; F04B 53/143; F04B 53/10
See application file for complete search history.

(56) References Cited

U.S. PATENT DOCUMENTS

| | | | | |
|---|---|---|---|---|
| 8,487,905 B2 * | 7/2013 | Kandziora | ............ | G06F 3/0412 178/18.06 |
| 9,098,153 B2 * | 8/2015 | Shen | .................... | G06F 3/0416 |
| 9,891,764 B2 * | 2/2018 | Song | ...................... | G06F 3/044 |
| 2010/0044122 A1 * | 2/2010 | Sleeman | ............ | G01D 5/2405 178/18.06 |
| 2014/0092026 A1 * | 4/2014 | Singh | .................... | G06F 3/044 345/173 |
| 2015/0035783 A1 * | 2/2015 | Brillant | ................ | G06F 3/0416 345/174 |
| 2015/0062062 A1 | 3/2015 | Han et al. | | |
| 2015/0070299 A1 * | 3/2015 | Chae | ...................... | G06F 3/044 345/174 |
| 2015/0277643 A1 * | 10/2015 | Kim | ...................... | G06F 1/1626 345/173 |
| 2016/0209957 A1 * | 7/2016 | Jung | ...................... | G06F 3/044 |
| 2017/0090622 A1 * | 3/2017 | Badaye | .................. | G06F 3/044 |

FOREIGN PATENT DOCUMENTS

JP 2015-049889 A 3/2015

\* cited by examiner

*Primary Examiner* — Erin F Heard
(74) *Attorney, Agent, or Firm* — K&L Gates LLP

(57) ABSTRACT

According to one embodiment, a display device includes drive electrodes, sensing electrodes, a driver, a first sensor circuit, and a second sensor circuit, wherein the drive electrodes include first drive electrodes and second drive electrodes which are arranged between the adjacent first drive electrodes, and a first width of the first drive electrodes in a first direction is an integer multiple of a second width of the second drive electrodes in the first direction.

7 Claims, 20 Drawing Sheets

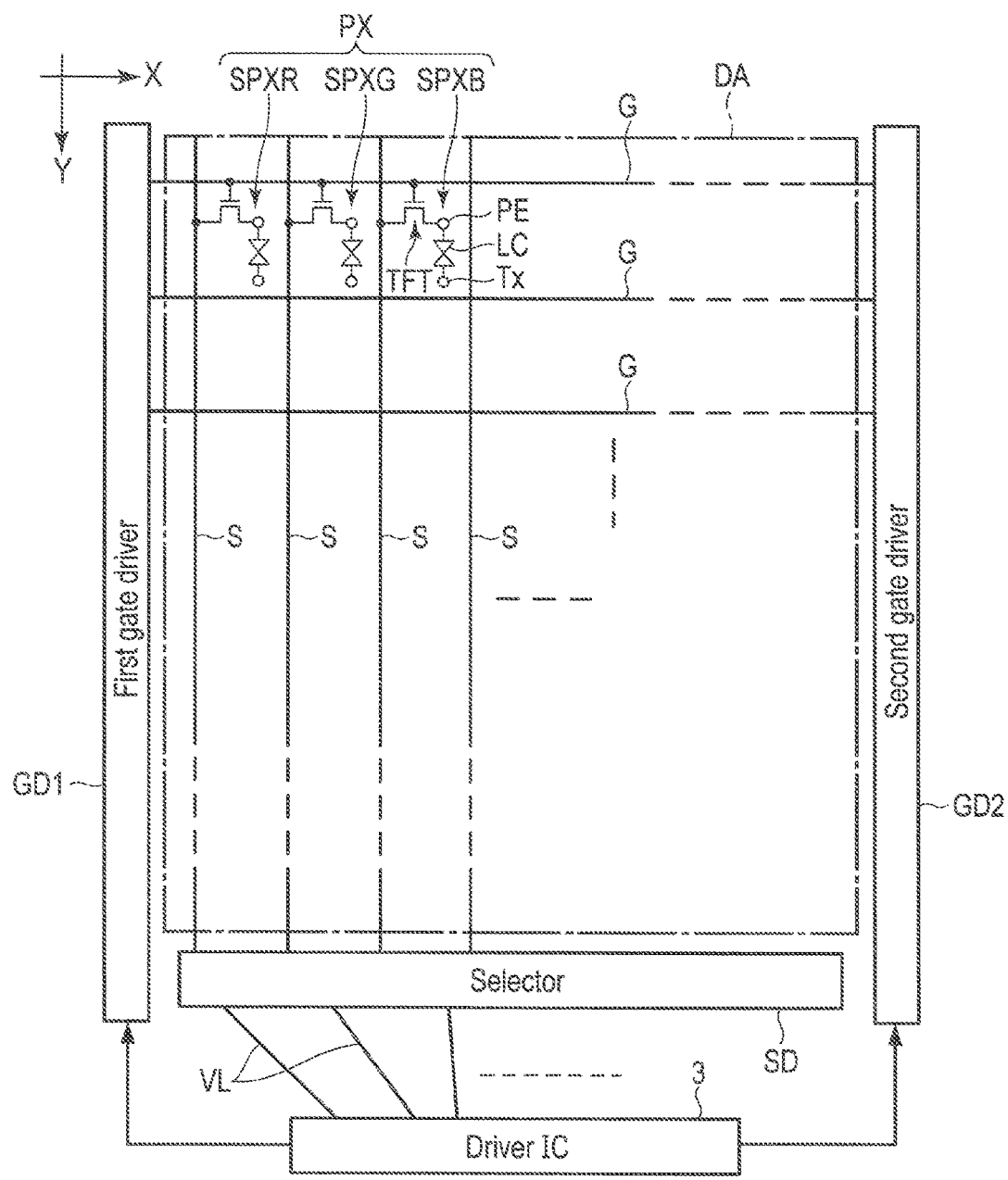
F I G. 5

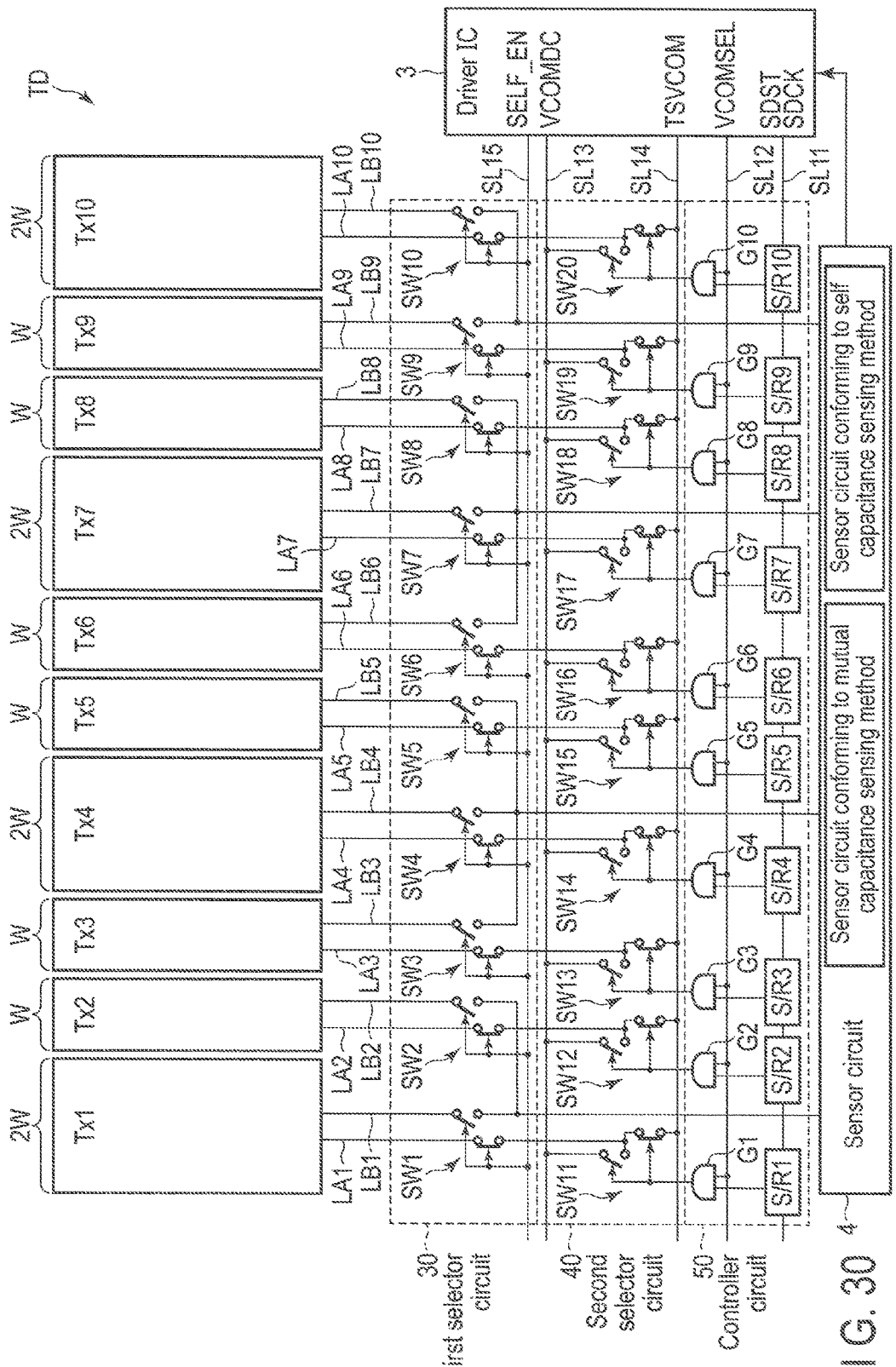
F I G. 30

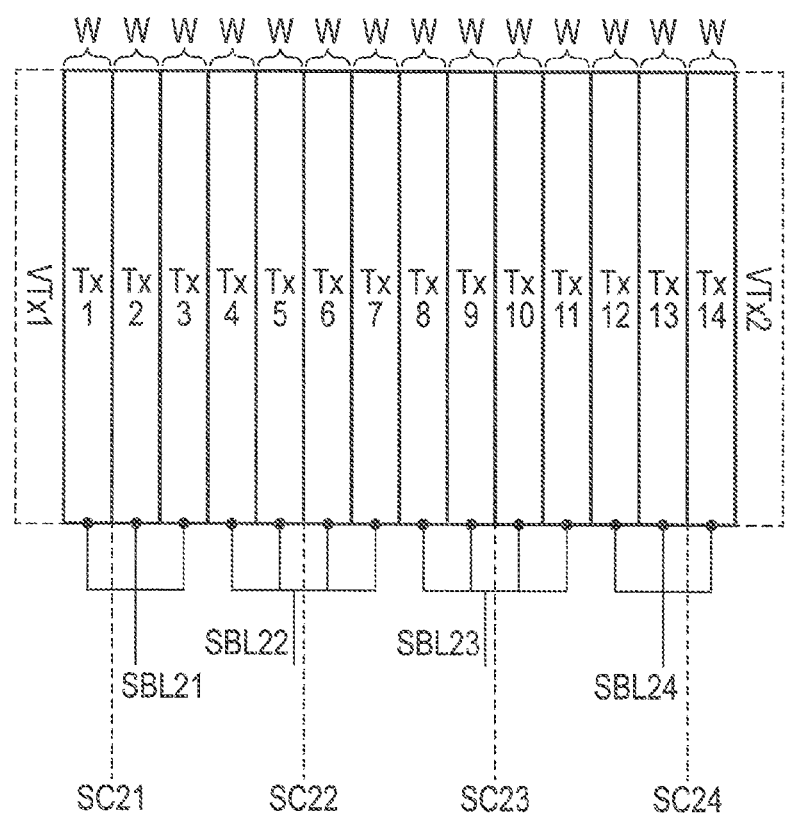
F I G. 34

DISPLAY DEVICE AND METHOD OF DRIVING THE SAME

CROSS-REFERENCE TO RELATED APPLICATIONS

This application is based upon and claims the benefit of priority from Japanese Patent Application No. 2016-092598, filed May 2, 2016, the entire contents of which are incorporated herein by reference.

FIELD

Embodiments described herein relate generally to a display device and a method of driving the same.

BACKGROUND

A touch-sensitive display device has been widely known. A touch sensor which realizes the touch sensing function of the display device is used as an input device of the display device. The touch sensor includes, for example, drive electrodes to which a drive signal is sequentially supplied and sensing electrodes which produce capacitance between the drive electrodes and the sensing electrodes, and realizes a method of sensing an object in contact with or in proximity to a sensing surface based on signals from the sensing electrodes and a method of sensing the object in contact with or in proximity to the sensing surface based on self capacitance of the drive electrodes.

As these two sensing methods are used in combination, the accuracy of touch sensing can be improved. However, since touch sensing is executed differently in these sensing methods, there is a case where the touch sensor makes an error in touch sensing.

Therefore, embodiments aim to provide a touch-sensitive display device and a driving method of the same which can realize touch sensing without causing any errors.

SUMMARY

The present application generally relates to a display device and a method of driving the same.

In an embodiment, a display device is provided. The display device includes drive electrodes which are arranged side by side in a first direction; sensing electrodes which produce capacitance between the drive electrodes and the sensing electrodes; a driver which supplies either a first drive signal or a second drive signal to the drive electrodes; a first sensor circuit which senses an object in contact with or in proximity to a sensing area based on first sensing signals which are obtained from the sensing electrodes in response to the first drive signal; and a second sensor circuit which senses the object in contact with or in proximity to the sensing area based on second sensing signals which are obtained from the drive electrodes in response to the second drive signal, wherein the drive electrodes include first drive electrodes and second drive electrodes which are arranged between the adjacent first drive electrodes, and a first width of the first drive electrodes in the first direction is an integer multiple of a second width of the second drive electrodes in the first direction.

In another embodiment, a driving method of a display device is provided in which the display device includes drive electrodes which are arranged side by side in a first direction; sensing electrodes which produce capacitance between the drive electrodes and the sensing electrodes; a driver which supplies either a first drive signal or a second drive signal to the drive electrodes; a first sensor circuit which senses an object in contact with or in proximity to a sensing area based on first sensing signals which are obtained from the sensing electrodes in response to the first drive signal; and a second sensor circuit which senses the object in contact with or in proximity to the sensing area based on second sensing signals which are obtained from the drive electrodes in response to the second drive signal, wherein the drive electrodes include first drive electrodes and second drive electrodes which are arranged between the adjacent first drive electrodes, and a first width of the first drive electrodes in the first direction is an integer multiple of a second width of the second drive electrodes in the first direction. The driving method includes sequentially supplying the first drive signal to the drive electrodes first block by first block, each of the first blocks including a first predetermined number of drive electrodes which are successively arranged in the first direction; simultaneously supplying the second drive signal to the drive electrodes second block by second block, each of the second blocks including a second predetermined number of drive electrodes which are successively arranged in the first direction; and aligning center lines of the first blocks in the first direction with center lines of the second blocks in the first direction, respectively.

BRIEF DESCRIPTION OF THE DRAWINGS

FIG. 5 is a diagram schematically showing the equivalent circuit for image display in the display device of the embodiment.

FIG. 30 is a diagram showing an example of the structure of a touch sensor which is incorporated in the display device.

FIG. 34 is a diagram showing an example of the self capacitance sensing of the other embodiment.

DETAILED DESCRIPTION

Figure 1:
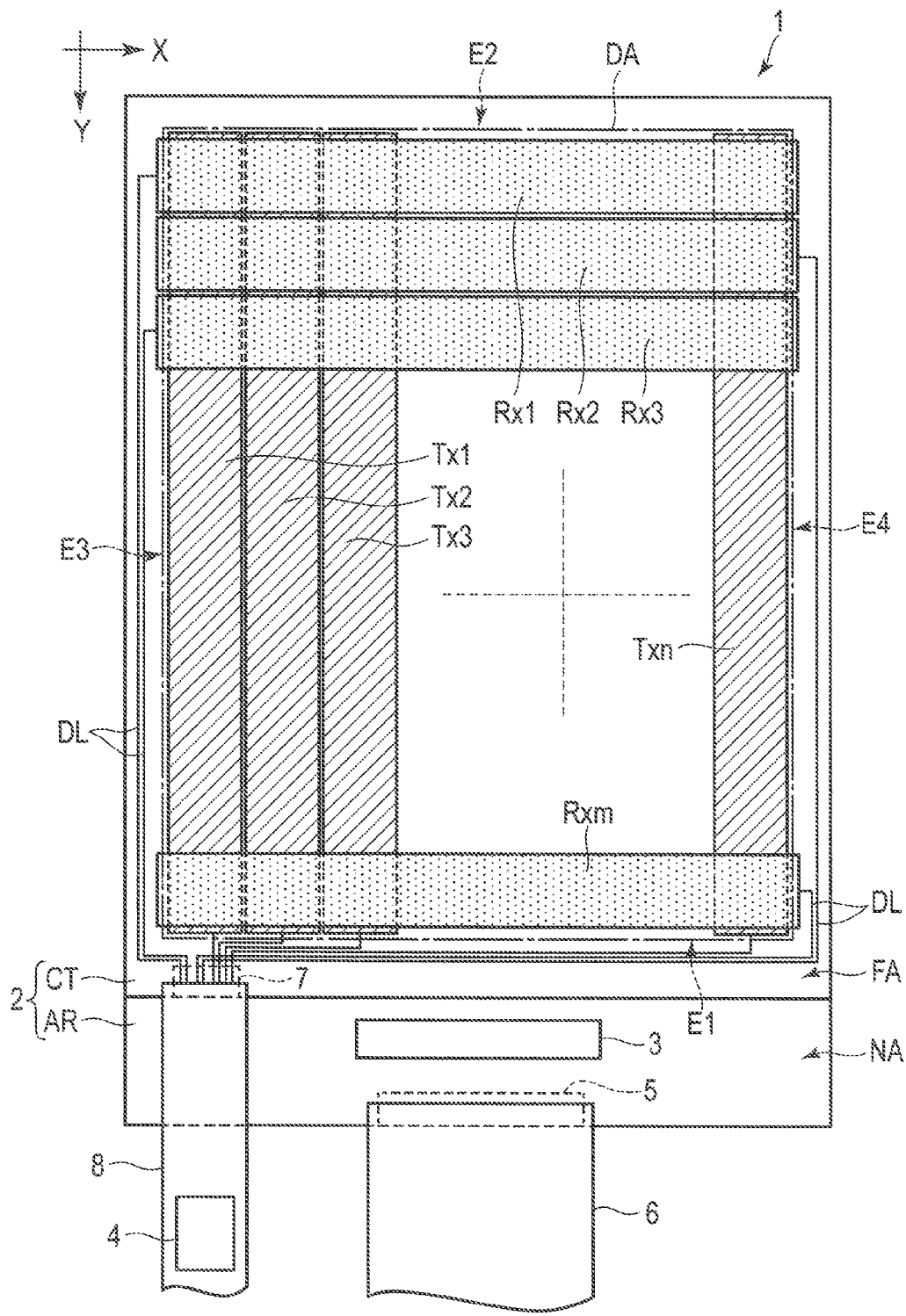
FIG. 1 is a plan view of the general structure of a display device of an embodiment.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated in the drawings schematically, rather than as an accurate representation of what is implemented. However, such schematic illustration is merely exemplary and in no way restricts the interpretation of the invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary.

In each embodiment, a display device including a display panel using a liquid crystal display element will be described as an example of a display device. However, the embodiment does not preclude the application of an individual technical idea disclosed in the embodiment to a display device using a display element other than the liquid crystal display element. As the display element other than the liquid crystal display element, a self-luminous display panel including an organic electroluminescent display element, an electronic-paper type display panel including an electrophoresis element, or the like may be considered.

FIG. 1 is a plan view schematically showing the structure of a touch-sensitive display device 1 of the present embodiment. The display device 1 can be used for various devices such as smartphones, tablet computers, mobile phones, personal computers, television receivers, in-car devices, and game consoles.

The display device 1 includes a display panel 2, drive electrodes TX (TX1 to TXn), sensing electrodes RX (RX1 to RXm) which are respectively opposed to the drive electrodes TX, a driver IC3 which functions as a driver module, and a sensor circuit 4. For example, n and m are integers greater than or equal to two. The drive electrodes may be referred to also as common electrodes.

The display panel 2 includes a rectangular array substrate AR (first substrate) and a rectangular counter-substrate CT (second substrate) which is smaller in outer shape than the array substrate AR. In the example shown in FIG. 1, the array substrate AR and the counter-substrate CT are attached to each other such that three sides of one substrate are laid on three sides of the other substrate. The array substrate AR includes a terminal area NA (unopposed area) which is not opposed to the counter-substrate CT.

In an area where the array substrate AR and the counter-substrate CT are opposed to each other, the display panel 2 includes a display area DA (active area) where an image is displayed, and a peripheral area FA between the display area DA and the edges of the display panel 2. In the example shown in FIG. 1, the display area DA is a rectangle which has a first side E1 which is located on the terminal area NA side, a second side E2 which is opposite to the first side E1, and a third side E3 and a fourth side E4 which connect the first side E1 and the second side E2. In the following description, a direction which is parallel to the first side E1 and the second side E2 will be referred to as a first direction X, and a direction which is parallel to the third side E3 and the fourth side E4 will be referred to as a second direction Y. Further, the first direction X and the second direction Y orthogonally cross each other in the present embodiment, but the first direction X and the second direction Y may cross each other at different angles.

In the display area DA, the drive electrodes TX1 to TXn extend from the first side E1 to the second side E2 in the second direction Y and are arranged side by side in the first direction X. The drive electrodes TX1 to TXn can be formed of a transparent conductive film such as indium tin oxide (ITO). For example, the drive electrodes TX1 to TXn are formed inside the display panel 2, that is, in the array substrate AR.

In the display area DA, the sensing electrodes RX1 to RXm extend from the third side E3 to the fourth side E4 in the first direction X, and are arranged side by side in the second direction Y. The sensing electrodes RX1 to RXm can be formed of a transparent conductive film of ITO or the like, or a conductive pattern of metal wire. The sensing electrodes RX1 to RXm are formed, for example, on a surface of the counter-substrate CT which is opposite to a surface of the counter-substrate CT which is opposed to the array substrate AR.

It is also possible to adopt such a structure where the drive electrodes TX1 to TXn extend in the first direction X and are arranged side by side in the second direction Y and the sensing electrodes RX1 to RXm extend in the second direction Y and are arranged side by side in the first direction Y.

The driver IC3 controls sensing and image display by supplying a drive signal to the drive electrodes TX1 to TXn and is mounted in the terminal area NA. Note that, although the driver IC3 is mounted therein by a Chip-on-Glass (COG) method in the present embodiment, the driver IC3 may be mounted on a first flexible printed circuit 6.

A mounting terminal 5 is formed in the terminal area NA. The mounting terminal 5 is connected to the first flexible printed circuit 6 which supplies image data to the display panel 2.

A mounting terminal 7 is formed at one end of the counter-substrate CT along the terminal area NA. The mounting terminal 7 is connected to the second flexible printed circuit 8 which outputs sensing signals from the sensing electrodes RX1 to RXm and the drive electrodes TX1 to TXn. In the example shown in FIG. 1, the sensor circuit 4 is mounted on the second flexible printed circuit 8.

For example, the sensing electrodes RX1 to RXm are connected to the mounting terminal 7 via sensing lines DL formed on the surface of the counter-substrate CT in the peripheral area FA. In the example of FIG. 1, those among the sensing lines DL which connect the mounting terminal 7 and the odd-numbered sensing electrodes RX as counted from the second side E2 side of the display area DA are arranged between the third side E3 of the display area DA and one end (on the left side of the drawing) of the counter-substrate CT and are connected to these odd-numbered sensing electrodes RX. On the other hand, those among the sensing lines DL which connect the mounting terminal 7 and the even-numbered sensing electrodes RX as counted from the second side E2 side of the display area DA are arranged between the first side E1 of the display area DA and one end of the counter-substrate CT on the terminal area NA side, and between the fourth side E4 of the display area DA and one end (on the right side of the drawing) of the counter-substrate CT, and are connected to these even-numbered sensing electrodes RX.

Figure 2:
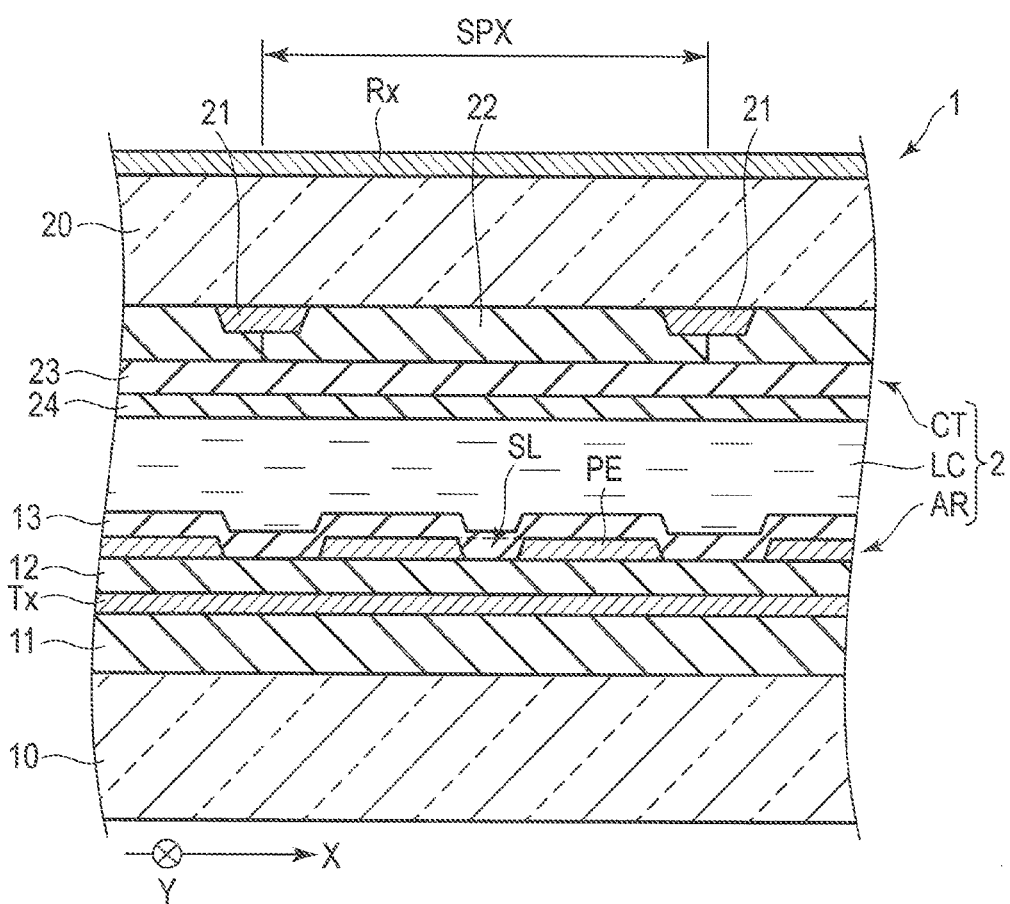
FIG. 2 is a diagram schematically showing an example of the section of the display device of the embodiment.

FIG. 2 is a diagram schematically showing an example of the section of the display device 1 in the display area DA. In the drawing, the section of one sub-pixel SPX is mainly illustrated. A single pixel for color image display is composed of sub-pixels SPX which correspond to different colors, respectively.

In the example of FIG. 2, the array substrate AR includes a first insulating substrate 10, a first insulating layer 11, a second insulating layer 12, a first alignment film 13, a pixel electrode PE, and the drive electrode TX. The first insulating layer 11 is formed on the surface of the first insulating substrate 10 on the counter-substrate CT side. The drive electrode TX is formed on the first insulating layer 11. The second insulating layer 12 covers the drive electrode TX. The pixel electrode PE is provided in each sub-pixel SPX and is formed on the second insulating layer 12. For example, the pixel electrode PE includes one or more slits SL. The first alignment film 13 covers the pixel electrode PE and a part of the second insulating layer 12.

The counter-substrate CT includes a second insulating substrate 20, a light-blocking layer 21, a color filter 22, an overcoat layer 23, and a second alignment film 24. The light-blocking layer 21 is formed on the surface of the second insulating substrate 20 on the array substrate AR side and defines the sub-pixel SPX. The color filter 22 is formed on the surface of the second insulating substrate 20 on the array substrate AR side and is colored according to the color of the sub-pixel SPX. The overcoat layer 23 covers the color filter 22. The second alignment film 24 covers the overcoat layer 23.

A liquid crystal layer LC containing liquid crystal molecules is formed between the first alignment film 13 and the second alignment film 24. For example, the sensing electrode RX is formed on a surface of the second insulating substrate 20 which is opposite to a surface of the second insulating substrate 20 which is opposed to the array substrate AR. Note that, although the drive electrode TX is formed in the array substrate AR in the example shown in FIG. 2, the drive electrode TX may be formed in the counter-substrate CT. In addition, the display panel 2 does not necessarily have the above-described internal structure and can also have various other structures.

Figure 3:
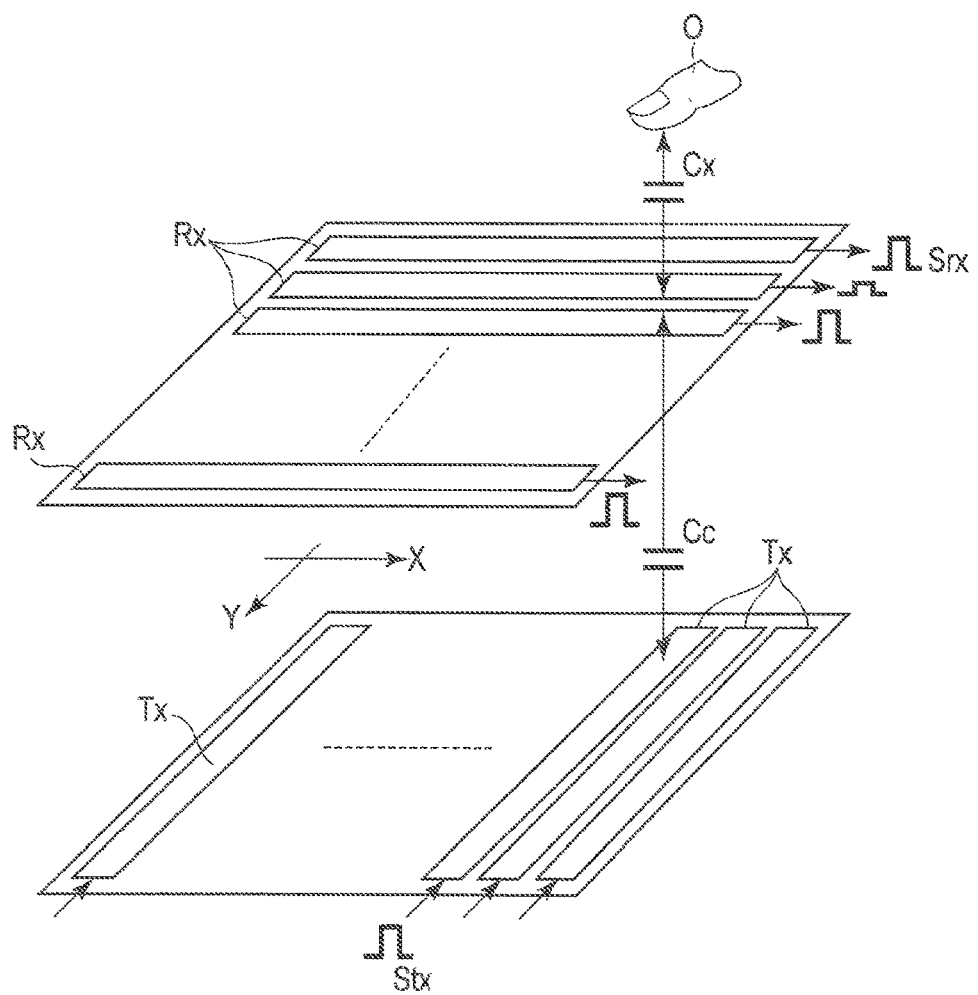
FIG. 3 is a diagram showing an example of the principle of sensing an object in contact with or in proximity to a display area.

Next, an example of the principle of sensing an object in contact with or in proximity to the display area DA by the drive electrodes TX and the sensing electrodes RX will be described with reference to FIG. 3.

Between the drive electrode TX and the sensing electrode RX which are opposed to each other, capacitance Cc exists. When a drive signal Stx is supplied to the drive electrode TX, an electric current flows to the sensing electrode RX via the capacitance Cc, and a sensing signal Srx is obtained from the sensing electrode RX. The drive signal Stx is, for example, a rectangular pulse, and the sensing signal Srx is a rectangular pulse and has a voltage corresponding to the drive signal Stx.

When a conductive object O such as a user's finger approaches the display device 1, capacitance Cx is produced between the object O and the sensing electrode RX in proximity to the object O. When the drive signal Stx is supplied to the drive electrode TX, the waveform of the sensing signal Srx which is obtained from the sensing electrode RX in proximity to the object O changes under the influence of the capacitance Cx. That is, the sensor circuit IC4 can sense the object O in contact with or in proximity to the display device 1 based on the sensing signals Srx which are obtained from the sensing electrodes RX, respectively. Further, the sensor circuit IC4 can sense the two-dimensional position of the object O in the first direction X and the second direction Y based on the sensing signals Srx which are obtained from the sensing electrodes RX in the respective time phases where the drive signal Stx is sequentially supplied to the respective drive electrodes TX in the time-sharing manner. The above-described sensing method is referred to as a mutual capacitance sensing method.

Figure 4:
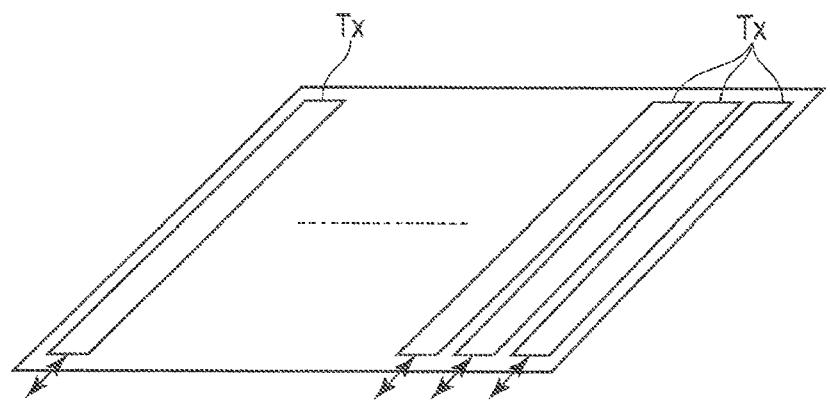
FIG. 4 is a diagram showing an example of the principle of sensing an object in contact with or in proximity to the display area.

Next, an example of the principle of sensing an object in contact with or in proximity to the display area DA by the drive electrodes TX will be described with reference to FIG. 4.

The sensor circuit 4 can sense the contact or approach of the object O based on a change in the self capacitance of the drive electrode TX. This sensing method will be hereinafter referred to as a self capacitance sensing method.

As these two sensing methods are used in combination, the touch-sensitive display device 1 can more reliably sense the contact or approach of the object O. For example, if water drops onto the display device 1, the display device 1 senses the water drop by the mutual capacitance sensing method but will not sense the water drop by the self capacitance sensing method. On the other hand, if a finger contacts the display device 1, the finger is sensed by both the mutual capacitance sensing method and the self capacitance sensing method. Therefore, when water drops onto the display device 1, the display device 1 will not erroneously sense the water drop as touch.

Next, the image display by the display device 1 will be described. FIG. 5 is a diagram schematically showing the equivalent circuit for the image display. The display device 1 includes scanning lines G, signal lines S crossing the scanning lines G, a first gate driver GD1, a second gate driver GD2, and a selector (RGB switch) SD. The selector SD is connected to the driver IC3 via video lines VL.

In the display area DA, each of the scanning lines G extends in the first direction X and is arranged side by side in the second direction Y. In the display area DA, each of the signal lines S extends in the second direction Y and is arranged side by side in the first direction X. All the scanning lines G and the signal lines S are formed in the array substrate AR. Each of the scanning lines G is connected to the first gate driver GD1 and the second gate driver GD2. Each of the signal lines S is connected to the selector SD.

In the example shown in FIG. 5, each of the areas defined by the scanning lines G and the signal lines S corresponds to one sub-pixel SPX. For example, in the present embodiment, a sub-pixel SPXR corresponding to red, a sub-pixel SPXG corresponding to green, and a sub-pixel SPXB corresponding to blue constitute one pixel PX. The pixel PX may further include a sub-pixel SPX corresponding to white, and the like.

Each of the sub-pixels SPX includes a thin-film transistor TFT (switching element) formed in the array substrate AR. The thin-film transistor TFT is electrically connected to the scanning line G, the signal line S, and the pixel electrode PE. In the display, the drive electrode TX is set at a common potential and functions as the so-called common electrode.

The first gate driver GD1 and the second gate driver GD2 sequentially supply a scanning signal to the scanning lines G. The selector SD selectively supplies a video signal to the signal lines S under the control of the driver IC3. More specifically, a scanning signal is supplied to a scanning line G connected to a thin-film transistor TFT, and a video signal is supplied to a signal line S connected to the thin-film transistor TFT. Subsequently, a voltage corresponding to the video signal is applied to the pixel electrode PE, the voltage produces an electric field between the pixel electrode PE and the drive electrode TX, and the electric field causes the alignment of the liquid crystal molecules of the liquid crystal layer LC to change from the initial alignment state where the liquid crystal layer LC is free from the voltage. In this way, the display device 1 displays an image in the display area DA.

As described above, in the display device 1 of the present embodiment, the drive electrodes TX are used both for the image display and the touch sensing.

Next, a structural example of the drive electrodes TX of the display device 1 will be described. The drive electrodes TX have, for example, a pitch 2W, and the pitch 2W is composed of, for example, forty pixels to one hundred pixels, and as described above, one pixel includes the sub-pixels SPXR, SPXG and SPXB. Here, the pitch of the drive electrodes TX corresponds to the width of the drive electrodes TX in the first direction X. The adjacent drive electrodes TX are separated from each other by a slit. A dummy slit may be further formed in each of the drive electrodes TX. For example, these slits including the slit between the adjacent drive electrodes TX and the dummy slit are arranged at regular intervals in the first direction X.

It is also possible to further provide a metal line between the adjacent sub-pixels which are arranged side by side in the first direction X in such a way that the metal line is opposed to the signal line S and extends in the second direction Y. For example, this metal line can be formed on the drive electrode TX. As the metal line is provided in this way, the resistance of the drive electrode TX can be reduced.

For example, the metal line may not be provided in the position of the slit between the adjacent drive electrodes TX or the position of the dummy slit. For example, it is possible to adopt such a structure where the slits between the adjacent electrodes TX and the dummy slits may be formed between the sub-pixels SPXR and SPXB, while the metal lines may be provided between the sub-pixels SPXR and SPXG and between the sub-pixels SPXG and SPXB.

The pitch of the drive electrode TX can be changed as needed. For example, some drive electrodes TX may have the pitch 2W, while the other drive electrodes TX may have a pitch W. As an example, the pitch 2W is 2 mm, and the pitch W is 1 mm.

Next, the mutual capacitance sensing and the self capacitance sensing of the display device 1 will be described with the following two structural examples. Firstly, as one structural example, a case where the drive electrodes TX have the pitch 2W and the number of the drive electrodes TX is an even number, and a case where the drive electrodes TX have the pitch 2W and the number of the drive electrodes TX is an odd number will be described, respectively. On the other hand, as the structure of the present embodiment, a case where some drive electrodes TX have the pitch 2W and the other drive electrodes TX have the pitch W and the sum of the number of those which have the pitch 2W and the number of the pairs of those which have the pitch W is an even number, and a case where some drive electrodes TX have the pitch 2W and the other drive electrodes TX have the pitch W and the sum of the number of those which have the pitch 2W and the number of the pairs of those which have the pitch W is an odd number will be described (One Structural Example of Drive Electrodes TX)
<Even Number of Drive Electrodes TX>

Figure 6:
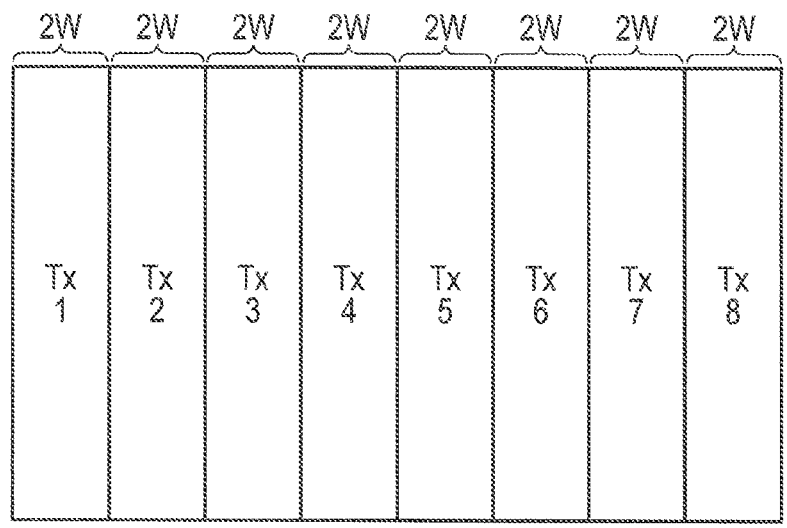
FIG. 6 is a diagram showing an example of drive electrodes of a structural example.

FIG. 6 shows a case where the number of the physically-separated drive electrodes TX is an even number and the drive electrodes TX include eight drive electrodes TX from a drive electrode TX1 to a drive electrode TX8. In this structure of the drive electrodes TX, the mutual capacitance sensing thereof will be described with reference to FIGS. 7 and 8, and the self capacitance sensing thereof will be described with reference to FIGS. 9 and 10.

Firstly, the mutual capacitance sensing will be described.

Figure 7:
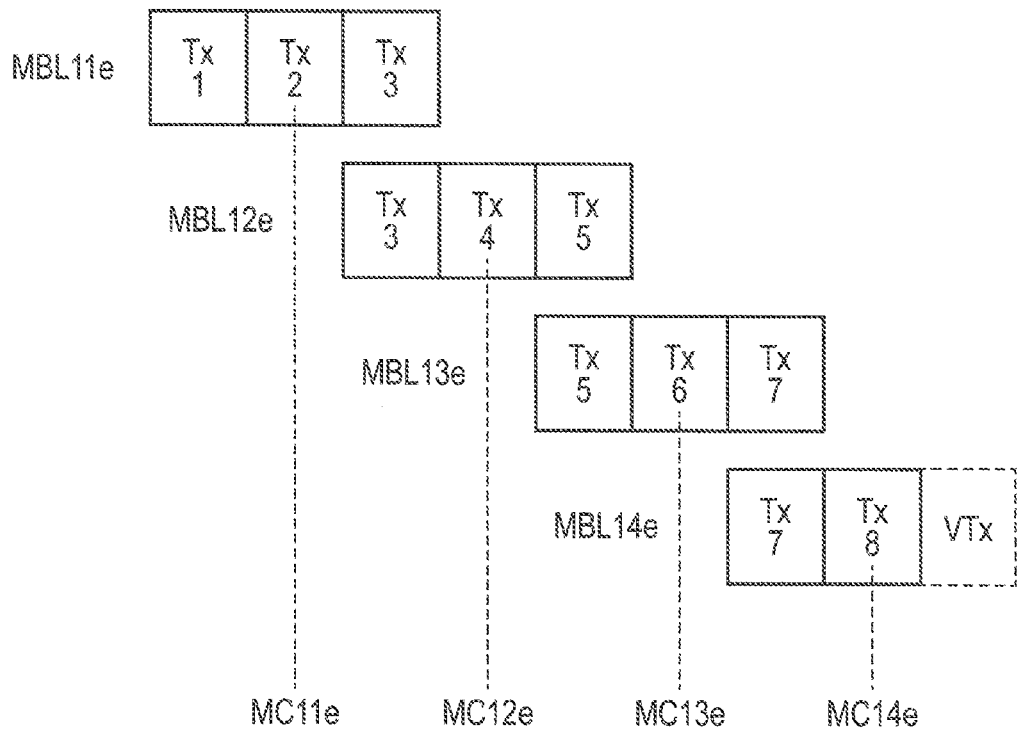
FIG. 7 is an explanatory diagram showing mutual capacitance sensing of the structural example.

In the example shown in FIG. 7, it is assumed that the drive electrodes TX1 to TX3 constitute a block MBL11e, the drive electrodes TX3 to TX5 constitute a block MBL12e, the drive electrodes TX5 to TX7 constitute a block MBL13e, and the drive electrodes TX7 and TX8 constitute a block MBL14e. In the mutual capacitance sensing, when the sensing is executed block MBL by block MBL (every three bundles), the drive electrodes TX of one block MBL partially overlap the drive electrodes TX of another block MBL. Note that, regarding the sensing of the block MBL14e, since the block MBL14e is composed of the drive electrodes TX7 and TX8, that is, two bundles, the driver IC3 uses a virtual drive electrode VTX and processes the block MBL14e virtually as three bundles. Further, the positions MC11e to MC14e of the widthwise centers of the drive electrodes TX2, TX4, TX6 and TX8 indicate the positions of the centers of the blocks MBL11e to MBL14e, respectively.

Figure 8:
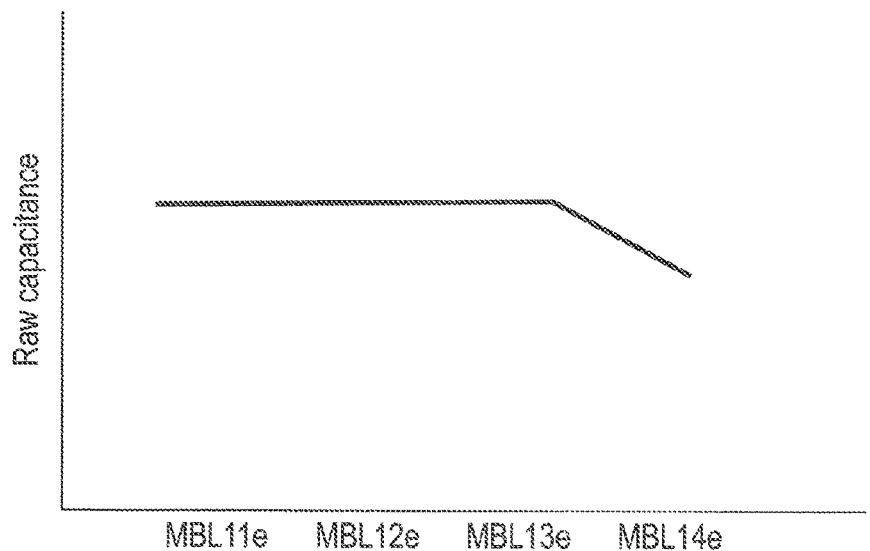
FIG. 8 is a graph showing an example of the result of the mutual capacitance sensing of the structural example.

The driver IC3 supplies the drive signal Stx to the block MBL11e and obtains the sensing results from the sensing electrodes RX. Subsequently, sensing is similarly executed with respect to the blocks MBL12e to MBL14e. FIG. 8 is a graph showing an example of the sensing results of the blocks MBL11e to MBL14e when the blocks MBL11e to MBL14e do not sense any object O. While each of the blocks MBL11e to MBL13e is composed of three bundles (pitch 6W), the block MBL14e is composed of two bundles (pitch 4W) and is processed virtually as three bundles together with the virtual drive electrode VTX. Therefore, the capacitance to be actually sensed will be different from each other, and the raw capacitance of the block MBL14e will be less than the raw capacitance of the blocks MBL11e to MBL13e. Here, the raw capacitance of the block MBL11e to MBL13e and the raw capacitance of the block MBL14e are different from each other as described above, and besides, the raw capacitance values are laterally asymmetric. Therefore, the driver IC3 cannot make raw capacitance corrections, and the accuracy of sensing will be degraded.

Next, the self capacitance sensing will be described.

Figure 9:
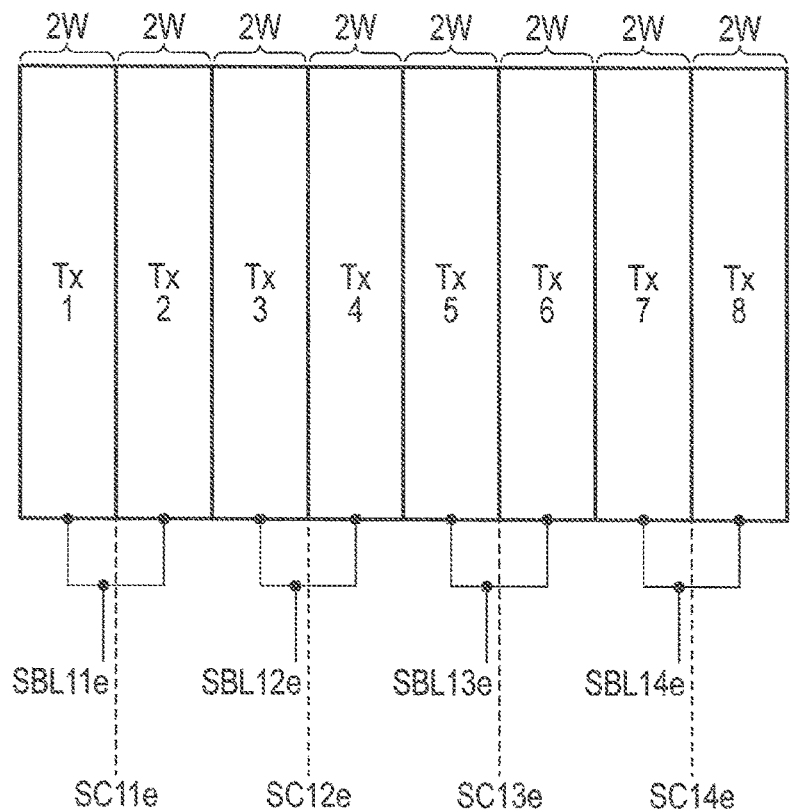
FIG. 9 is an explanatory diagram showing self capacitance sensing of the structural example.

In the example shown in FIG. 9, it is assumed that the drive electrodes TX1 and TX2 constitute a block SBL11e, the drive electrodes TX3 and TX4 constitute a block SBL12e, the drive electrodes TX5 and TX6 constitute a block SBL13e, and the drive electrodes TX7 and TX8 constitute a block SBL14e. Further, the positions SC11e to SC14e between the drive electrodes TX1 and TX2, the drive electrodes TX3 and TX4, the drive electrodes TX5 and TX6, and the drive electrodes TX7 and TX8 indicate the positions of the centers of the blocks SBL11e to SBL14e, respectively.

Figure 10:
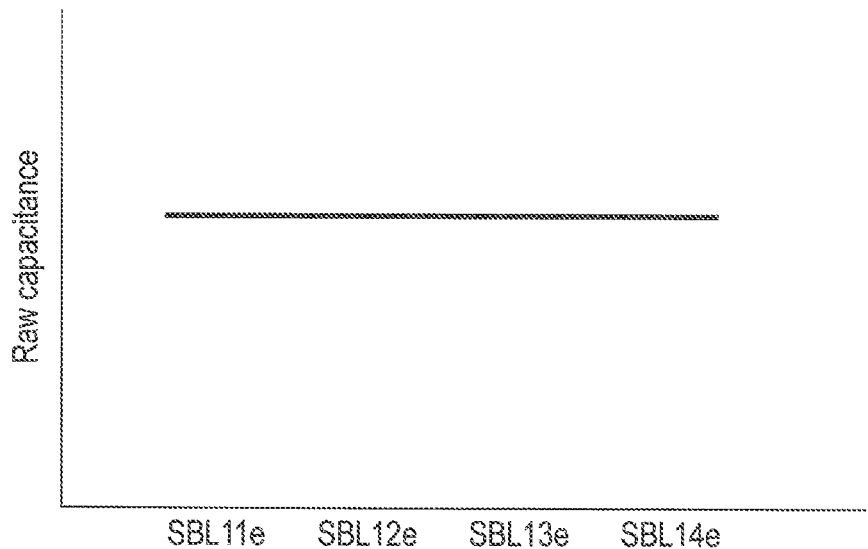
FIG. 10 is a graph showing an example of the result of the self capacitance sensing of the structural example.

The driver IC3 simultaneously obtains the sensing results of the blocks SBL11e to SBL14e. FIG. 10 is a graph showing an example of the sensing results of the blocks SBL11e to SBL14e when the blocks SBL11e to SBL14e do not sense any object O. Since each of the blocks SBL11e to SBL14e is composed of two bundles (pitch 4W) and has the same capacitance as each other, the raw capacitance value will be the same as each other.

As described above, in a case where the drive electrodes TX have the pitch W2 and the number of the drive electrodes TX is an even number, the positions MC11e to MC14e of the blocks MBL11e to MBL14e in the mutual capacitance sensing and the positions SC11e to SC14e of the blocks SBL11e to SBL14e in the self capacitance sensing are not aligned with each other. In this way, when sensing is executed by two sensing methods in combination, the centers of the blocks in one sensing may not be aligned with the centers of the blocks in the other sensing, and this may cause the driver IC3 to make an error in sensing the object O.

<Odd Number of Drive Electrodes TX>

Figure 11:
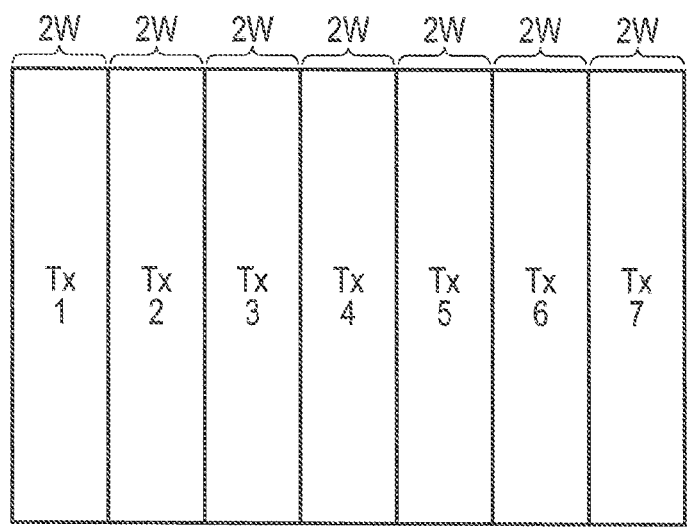
FIG. 11 is a diagram showing another example of the drive electrodes of the structural example.

FIG. 11 shows a case where the number of the physically-separated drive electrodes TX is an odd number and the drive electrodes TX include seven drive electrodes TX from a drive electrode TX1 to a drive electrode TX7. In this structure of the drive electrodes TX, the mutual capacitance sensing thereof will be described with reference to FIGS. 12 and 13, and the self capacitance sensing thereof will be described with reference to FIGS. 14 and 15.

Firstly, the mutual capacitance sensing will be described.

Figure 12:
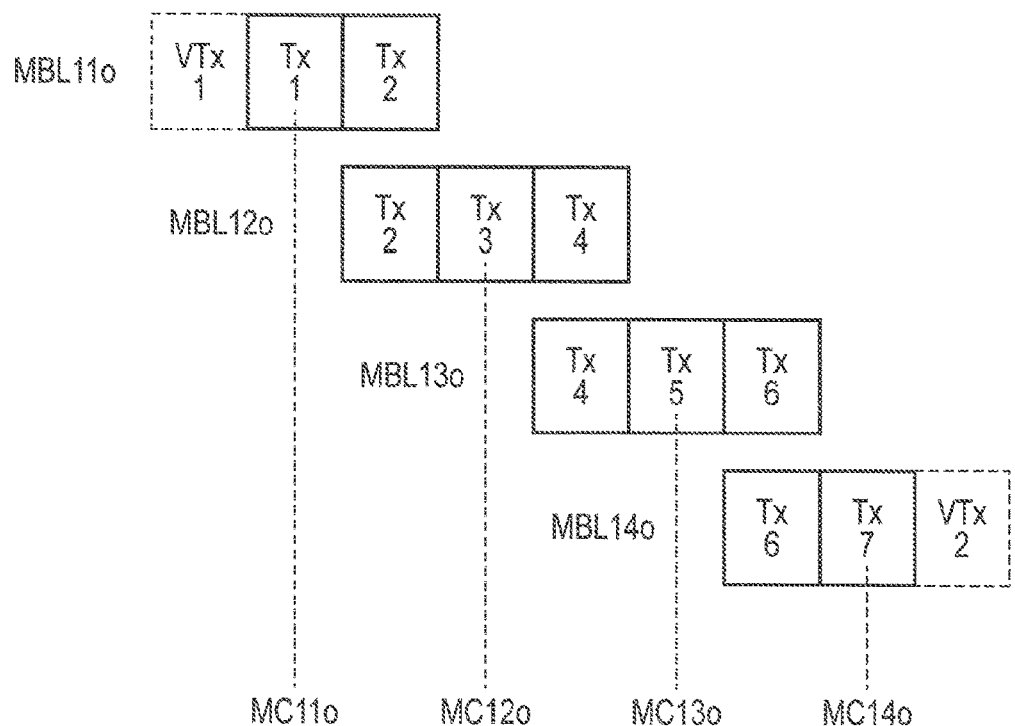
FIG. 12 is an explanatory diagram showing mutual capacitance sensing of the structural example.

In the example shown in FIG. 12, it is assumed that the drive electrodes TX1 and TX2 constitute a block MBL11o, the drive electrodes TX2 to TX4 constitute a block MBL12o, the drive electrodes TX4 to TX6 constitute a block MBL13o, and the drive electrodes TX6 and TX7 constitute a block MBL14o. In the structure of the odd number of drive electrodes TX also, the drive electrodes TX are driven in a way that the drive electrodes TX of one block MBL partially overlap the drive electrodes TX of another block MBL. Note that, since each of the block MBL11o and the block BML14o is composed of two bundles, the driver IC3 uses a virtual drive electrode VTX1 for the block MBL11o and a virtual drive electrode VTX2 for the block MBL14o and processes each of the block MBL11o and the block MBL14o virtually as three bundles. Further, the positions MC11o to MC14o of the widthwise centers of the drive electrodes TX1, TX3, TX5 and TX7 indicate the positions of the centers of the blocks MBL11o to MBL14o, respectively.

Figure 13:
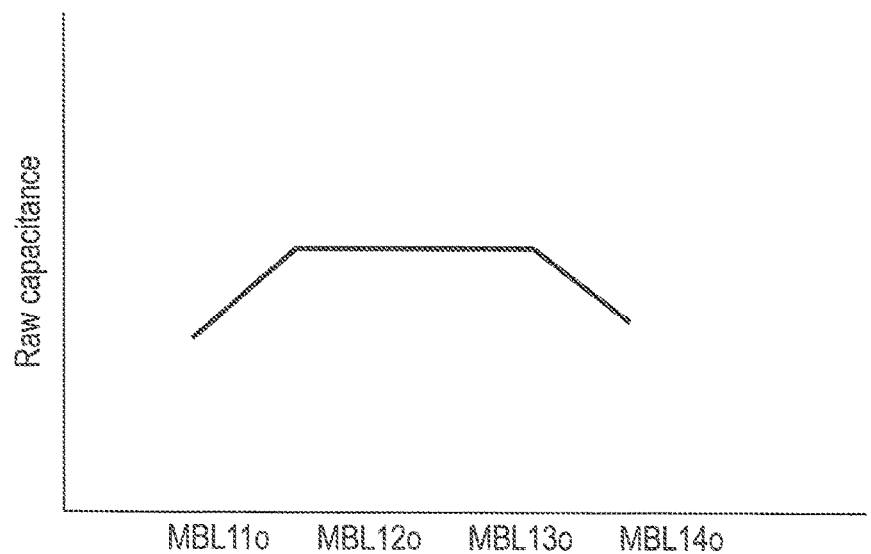
FIG. 13 is a diagram showing an example of the result of the mutual capacitance sensing of the structural example.

The driver IC3 supplies the drive signal Stx to the block MBL11o and obtains the sensing results from the sensing electrodes RX. Subsequently, sensing is similarly executed with respect to the blocks MBL12o to MBL14o. FIG. 13 is a graph showing an example of the sensing results of the blocks MBL11o to MBL14o when the blocks MBL11o to MBL14o do not sense any object O. While each of the blocks MBL12o and MBL13o is composed of three bundles (pitch 6W), each of the blocks MBL11o and MBL14o is composed of two bundles (pitch 4W) and is processed virtually as three bundles together with each of the drive electrode VTX1 and VTX2. Therefore, the capacitance to be actually sensed will be different from each other, and the raw capacitance of the blocks MBL11o and MBL14o will be less than the raw capacitance of the blocks MBL12o and MBL13o. In this way, the raw capacitance of the blocks MBL11o and MBL14o and the raw capacitance of the blocks MBL12o and the MBL13o will be different from each other. In the example shown in FIG. 13, the raw capacitance of the blocks MBL11o and MBL14o is less than the raw capacitance of the blocks MBL12o and MBL13o. Although the raw capacitance is different from each other as described above, since the raw capacitance values are laterally symmetric, the driver IC3 can easily make raw capacitance corrections.

Next, the self capacitance sensing will be described.

Figure 14:
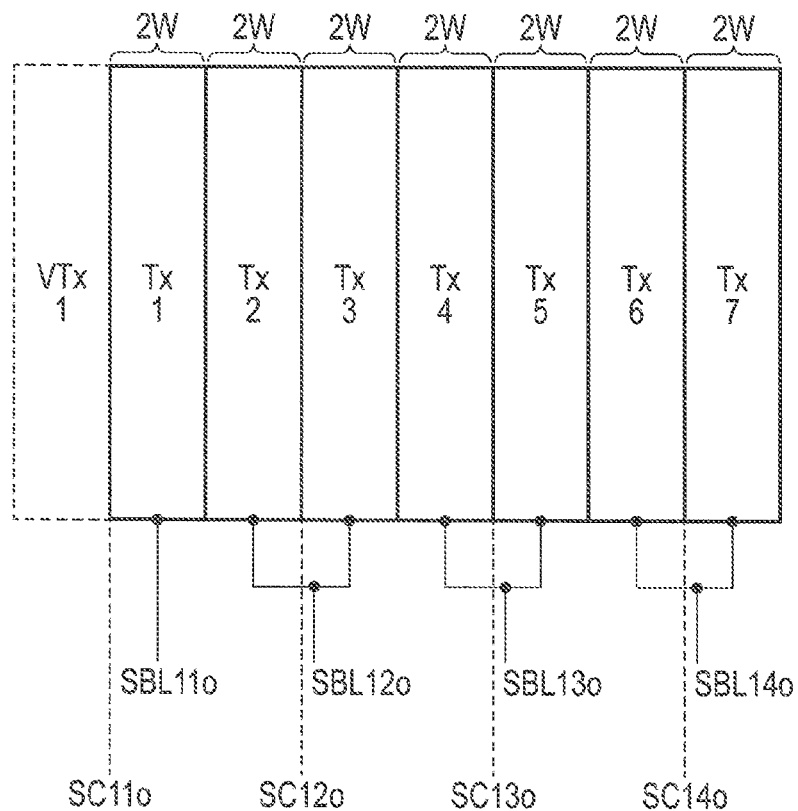
FIG. 14 is an explanatory diagram showing self capacitance sensing of the structural example.

In the example shown in FIG. 14, it is assumed that the drive electrode TX1 constitutes a block SBL11o, the drives TX2 and TX3 constitute a block SBL12o, the drive electrodes TX4 and TX5 constitute a block SBL13o, the drive electrodes TX6 and TX7 constitute a block SBL14o. Note that, regarding the sensing of the block SBL11o, since the block SBL11o is composed of the drive electrode TX1, that is, one bundle, the driver IC3 uses a virtual drive electrode VTX and processes the block SBL11o virtually as two bundles. Further, the position SC11o of the center of the drive electrode TX1 and the positions SC12o to SC14o between the drive electrodes TX2 and TX3, the drive electrodes TX4 and TX5 and the drive electrodes TX6 and TX7 indicate the positions of the centers of the blocks SBL11o to SBL14o, respectively.

Figure 15:
FIG. 15 is a graph showing an example of the result of the self capacitance sensing of the structural example.

The driver IC3 simultaneously obtains the sensing results of the blocks SBL11o to SBL14o. FIG. 15 is a graph showing an example of the sensing results of the blocks SBL11o to SBL14o when the blocks SBL11o to SBL14o do not sense any object O. While each of the blocks SBL12o to SBL14o is composed of two bundles (pitch 4W), the block SBL11o is composed of one bundle (pitch 2W) and is processed virtually as two bundles together with the virtual drive electrode VTX. Therefore, the capacitance to be actually sensed will be different from each other, and the raw capacitance of the block SBL11o will be less than the raw capacitance of the blocks SBL12o to SBL14o. As described above, since the raw capacitance of the blocks SBL12o to SBL14o and the raw capacitance of the block SBL11o are different from each other and the raw capacitance values are laterally asymmetric, the driver IC3 cannot make raw capacitance corrections, and consequently the accuracy of sensing will be degraded.

As described above, in a case where the drive electrodes TX have the pitch W2 and the number of the drive electrodes TX is an odd number, the positions MC11e to MC14e of the blocks MBL11e to MBL14e in the mutual capacitance sensing and the positions SC11o to SC14o of the blocks SBL11e to SBL14e in the self capacitance sensing are not aligned with each other. In this way, when sensing is executed by two sensing methods in combination, the centers of the blocks in one sensing may not be aligned with the centers of the blocks in the other sensing, and this may cause the driver IC3 to make an error in sensing the object O.

Therefore, the driver IC3 may make an error in sensing the object O regardless of whether the number of the drive electrodes TX of the pitch 2W is an even number or an odd number. Now, the mechanism of making an error in sensing the object O, for example, in a case (see FIG. 11) where the drive electrodes TX have the pitch W2 and the number of the drive electrodes TX is an odd number will be described with reference to FIGS. 16 to 19.

Figure 16:
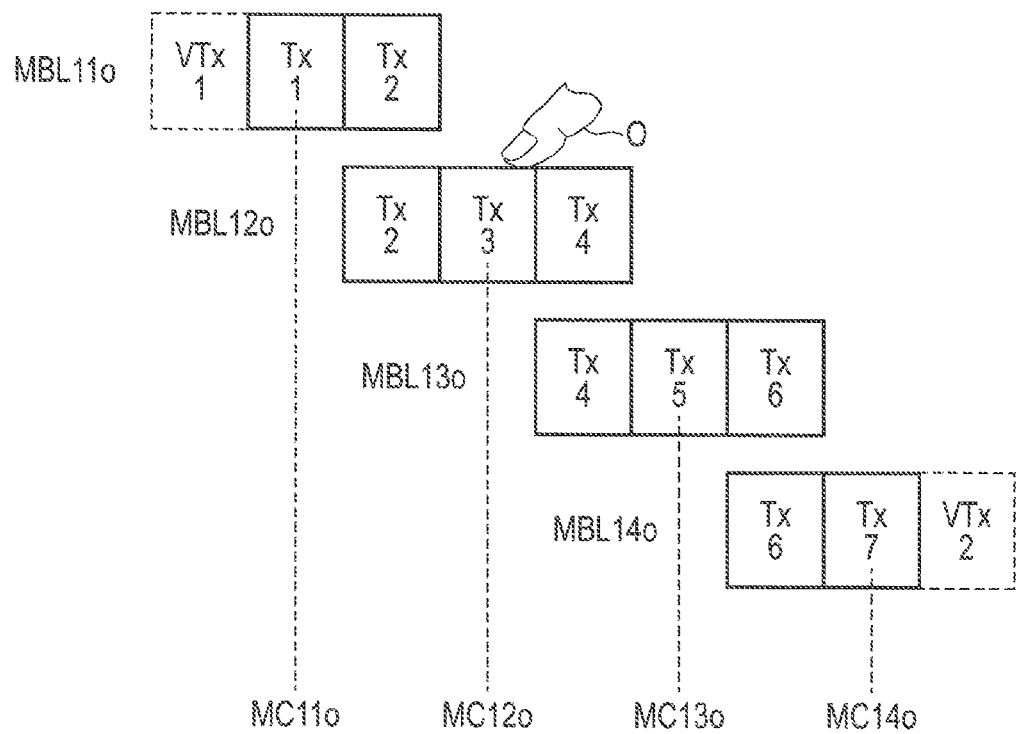
FIG. 16 is a diagram showing a specific example of the mutual capacitance sensing of the structural example.
Figure 17:
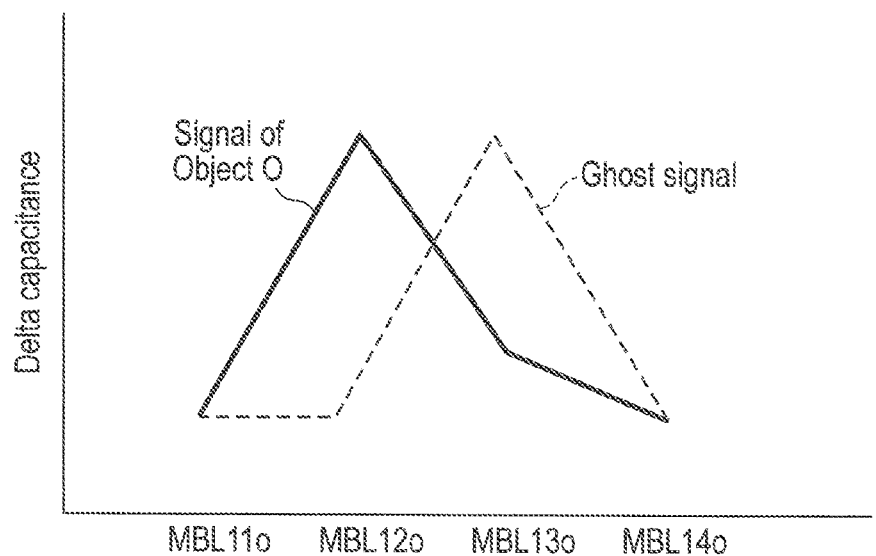
FIG. 17 is a diagram showing an example of the result of the mutual capacitance sensing of FIG. 16.

As shown in the example shown in FIG. 16, it is assumed that the object O contacts the drive electrode TX3 and partially contacts the drive electrode TX4.

In the mutual capacitance sensing, since the drive electrode TX3 is included in the block MBL12o, the object O is sensed when the drive signal Stx is supplied to the block MBL12o. In the example shown in FIG. 17, a large signal (high delta capacitance) is sensed when the block MBL12o is driven. Note that, while no signal is sensed in the blocks MBL11o and MBL14o, a signal (delta capacitance) is slightly sensed in the block MBL13o since the object O partially contacts the block MBL13o. Further, there is a case where, as shown by dashed lines in FIG. 17, a ghost signal is produced by a noise some time after the signal of sensing the object O. In that case, the driver IC3 will sense the object O in the blocks MBL12o and MBL13o.

Figure 18:
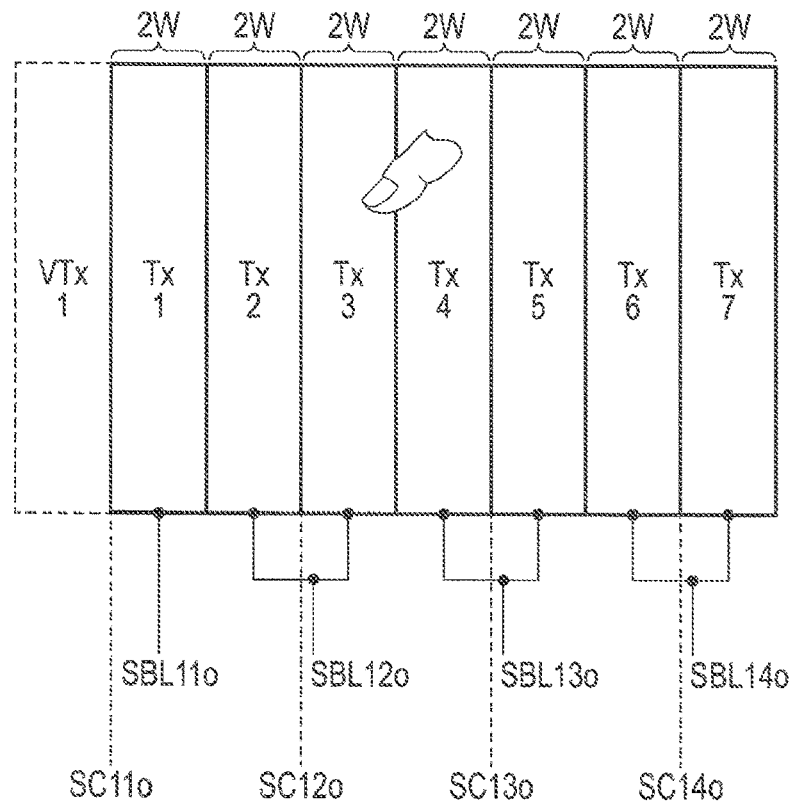
FIG. 18 is a diagram showing a specific example of the self capacitance sensing of the structural example.

On the other hand, in the self capacitance sensing, as in the case with the example shown in FIG. 16, it is assumed that the object O contacts the drive electrode TX3 and partially contacts the drive electrode TX4 as shown in FIG. 18.

Figure 19:
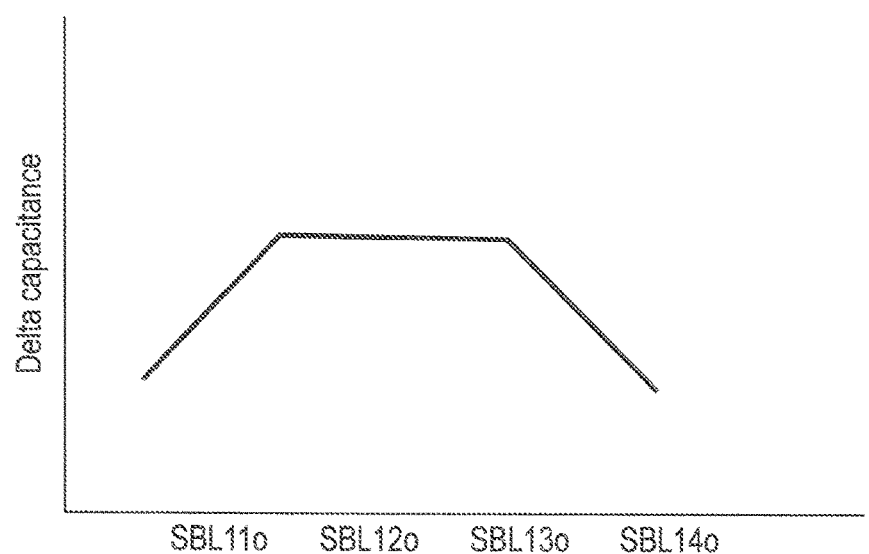
FIG. 19 is a diagram showing an example of the result of the self capacitance sensing of FIG. 18.

Since the drive electrode TX3 is included in the block SBL12o and the drive electrode TX4 is included in the block SBL13o, as shown in FIG. 19, a large signal (delta capacitance) is sensed in the blocks SBL12o and SBL13o. Note that no signal is sensed in the blocks SBL11o and SBL14o. In this way, the driver IC3 will sense the object O in the block SBL12o and SBL13o.

Therefore, the object O is sensed in the block MBL12o (drive electrodes TX2 to TX4) and the block MBL13o (drive electrodes TX4 to TX6) and also in the block SBL12o (drive electrodes TX2 and TX3) and the block SBL13o (drive electrodes TX4 and TX5). In this way, the driver IC3 erroneously senses the object O not only in the block MBL12o but also in the block MBL13o which does not actually sense the object O.

(Structure of Drive Electrodes TX of Embodiment)
>First Embodiment: Even Number of Drive Electrodes TX>

Figure 20:
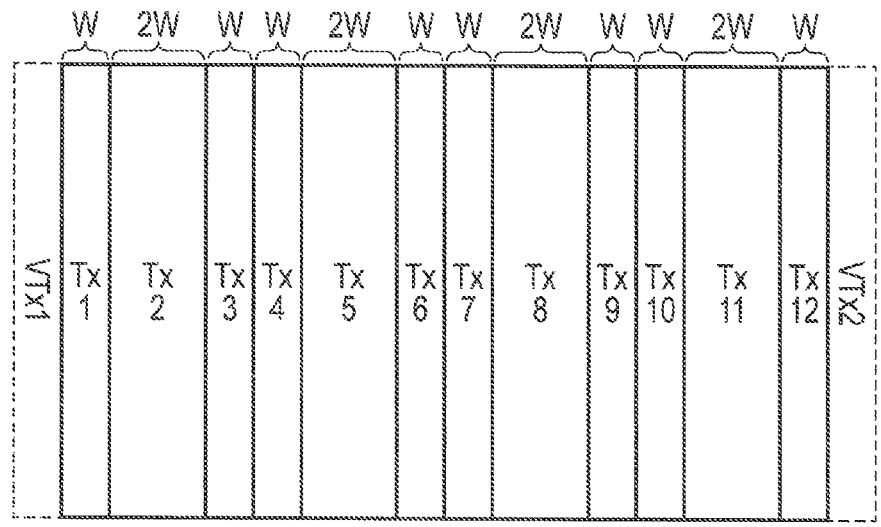
FIG. 20 is a diagram showing an example of the structure of drive electrodes of the first embodiment (corresponding to the structural example of the even number of drive electrodes).

FIG. 20 shows a case where the sum of the number of the drive electrodes TX of the pitch 2W and the number of the pairs of the drive electrodes TX of the pitch W is an even number and the drive electrodes TX include twelve drive electrodes TX from the drive electrode TX1 to TX12. The drive electrodes TX2, TX5, TX8 and TX11 have the pitch 2W (first width), and the drive electrodes TX1, TX3, TX4, TX6, TX7, TX9, TX10 and TX12 have the pitch W (second width). Therefore, the drive electrodes TX are composed of repeated cycles of the drive electrode TX of the pitch W, the drive electrode TX of the pitch 2W and the drive electrode TX of the pitch W. This arrangement will be hereinafter referred to as the first arrangement pattern. Note that, although the pitch 2W (first width) is assumed to be twice the pitch W (second width) in the structure of the present embodiment, the first width may be an integer multiple of the second width.

In this structure of the drive electrodes TX, the mutual capacitance sensing thereof will be described with reference to FIGS. 21 and 22, and the self capacitance sensing thereof will be described with reference to FIGS. 23 and 24.

Firstly, the mutual capacitance sensing will be described.

Figure 21:
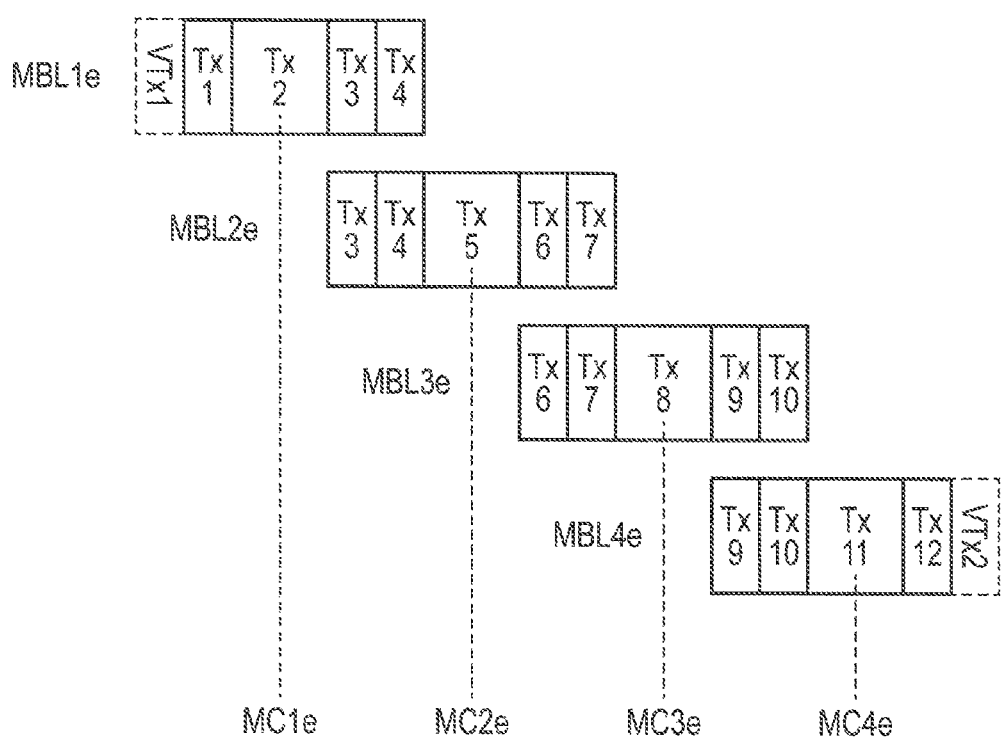
FIG. 21 is an explanatory diagram showing mutual capacitance sensing of the first embodiment.
Figure 22:
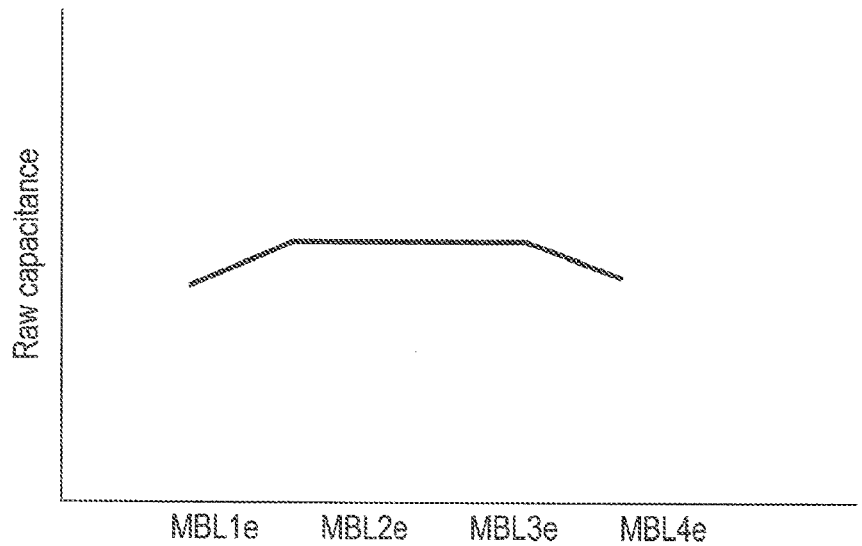
FIG. 22 is a diagram showing an example of the result of the mutual capacitance sensing of the first embodiment.

In the example shown in FIG. 21, it is assumed that the drive electrodes TX1 to TX4 constitute a block MBL1e, the drive electrodes TX3 to TX7 constitute a block MBL2e, the drive electrodes TX6 to TX10 constitute a block MBL3e, and the drive electrodes TX9 and TX12 constitute a block MBL4e. Therefore, the driver IC3 drives the drive electrodes TX of the blocks MBL (first blocks) every five bundles (pitch 6W, first predetermined number) in such a way that the drive electrodes TX of one block MBL partially overlap the drive electrodes TX of another block MBL. Note that, regarding the sensing of the blocks MBL1e and MBL4e, since each of the blocks MBL1e and MBL4e is four bundles, the driver IC3 uses a virtual drive electrode VTX1 of the pitch W for the block MBL1e and a virtual drive electrode VTX2 of the pitch W for the block MBL4e and processes each of the blocks MBL1e and MBL4e virtually as five bundles. Further, the positions MC1e to MC4e of the widthwise centers of the drive electrodes TX2, TX5, TX8 and TX11 indicate the positions of the centers of the blocks MBL1e to MBL4e, respectively.

The driver IC3 supplies the drive signal Stx to the block MBL1e and obtains the sensing results from the sensing electrodes RX. Subsequently, sensing is similarly executed with respect to the blocks MBL2e to MBL4e. FIG. 22 is a graph showing an example of the sensing results of the blocks MBL1e to MBL4e when the blocks MBL1e to MBL4e do not sense any object O. While each of the blocks MBL2e and MBL3e is composed of five bundles (pitch 6W), each of the blocks MBL1e and MBL4e is composed of four bundles (pitch 5W) and is processed virtually as five bundles together with each of the drive electrodes VTX1 and VTX2. Therefore, the capacitance to be actually sensed will be different from each other, and the raw capacitance of the blocks MBL2e and MBL3e and the raw capacitance of the blocks MBL1e and MBL4e will be different from each other. In the example shown in FIG. 22, the raw capacitance of the blocks MBL1e and MBL4e is less than the raw capacitance of the blocks MBL2e and MBL3e. Although the raw capacitance is different from each other as described above, since the raw capacitance values are laterally symmetric, the driver IC3 can easily make raw capacitance corrections.

Further, the capacitance ratio of the virtual drive electrode VTX1 (pitch 6W: pitch W) is less than that of the structural example of the even number of drive electrodes TX (pitch 6W: pitch 2W, see FIG. 8), and thus the driver IC3 can make raw capacitance corrections more easily.

Next, the self capacitance sensing will be described.

Figure 23:
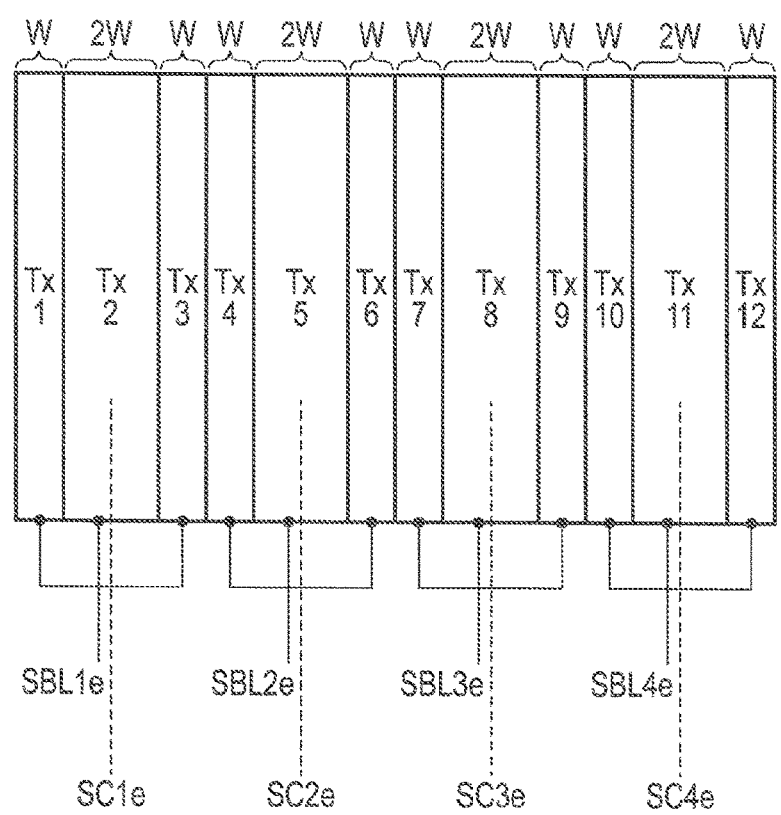
FIG. 23 is an explanatory diagram showing self capacitance sensing of the first embodiment.
Figure 24:
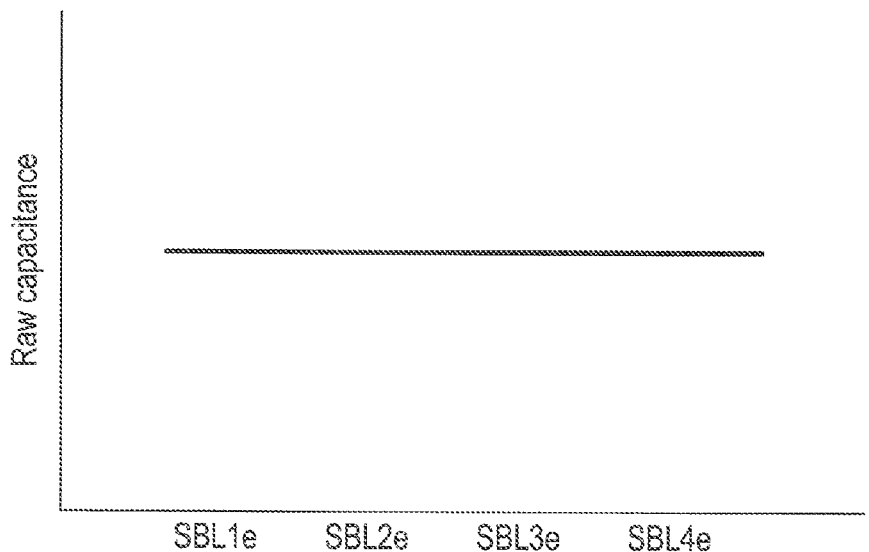
FIG. 24 is a diagram showing an example of the result of the self capacitance sensing of the first embodiment.

In the example shown in FIG. 23, it is assumed that the drive electrodes TX1 to TX3 constitute a block SBL1e, the drive electrodes TX4 to TX6 constitute a block SBL2e, the drive electrodes TX7 to TX9 constitute a block SBL3e, and the drive electrodes TX10 and TX12 constitute a block SBL4e. The drive electrodes TX in the blocks SBL1e to SBL4e (second blocks) are driven block SBL by block SBL, that is, every three bundles (pitch 4W, second predetermined number). Further, the positions SC1e to SC4e of the widthwise centers of the drive electrodes TX2, TX5, TX8 and TX11 indicate the positions of the centers of the blocks SBL1e to SBL4e, respectively. Therefore, the positions MC1e to MC4e of the centers in the mutual capacitance sensing are aligned with the positions SC1e to SC4e of the centers in the self capacitance sensing, respectively.

The driver IC3 simultaneously obtains the sensing results of the blocks SBL1e to SBL4e. FIG. 24 is a graph showing an example of the sensing results of the blocks SBL1e to SBL4e when the blocks SBL1e to SBL4e do not sense any object O. Since each of the blocks SBL1e to SBL4e is composed of three bundles (pitch 4W) and the capacitance is the same as each other, the raw capacitance value will be the same as each other.

As described above, the positions MC1e to MC4e of the centers in the mutual capacitance sensing are aligned with the positions SC1e to SC4e of the centers in the self capacitance sensing, respectively. Therefore, even when sensing is executed by two sensing methods in combination and if the object O contacts or approaches, unlike the structural example (see FIGS. 16 to 19), a position where the object O is sensed by one sensing method will not be misaligned with a position where the object O is sensed by the other sensing method. Therefore, the driver IC3 can avoid making an error in sensing the object O even when, for example, a ghost signal is produced by a noise and accurately sense the position of the object O.

<Second Embodiment: Odd Number of Drive Electrodes TX>

Figure 25:
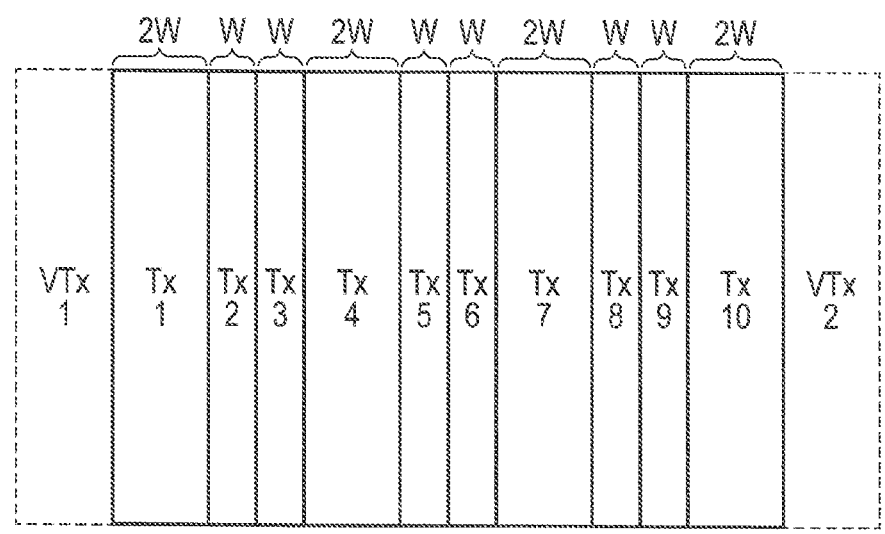
FIG. 25 is a diagram showing an example of the structure of drive electrodes of the second embodiment (corresponding to the structural example of the odd number of drive electrodes).

FIG. 25 shows a case where the sum of the number of the drive electrodes TX of the pitch 2W and the number of the pairs of the drive electrodes TX of the pitch W is an odd number and the drive electrodes TX include ten drive electrodes TX from the drive electrodes TX1 to TX10. The drive electrodes TX1, TX4, TX7 and TX10 have the pitch 2W (first width), and the drive electrodes TX2, TX3, TX5, TX6, TX8 and TX9 have the pitch W (second width). Therefore, as compared to the example shown in FIG. 14, the even-numbered drive electrodes TX as counted from the first electrode TX1 are divided in half. This arrangement will be hereinafter referred to as the second arrangement pattern. Note that, although the pitch 2W (first width) is assumed to be twice the pitch W (second width) in the structure of the present embodiment, the first width may be an integer multiple of the second width.

In this structure of the drive electrodes TX, the mutual capacitance sensing thereof will be described with reference to FIGS. 26 and 27, and the self capacitance sensing thereof will be described with reference to FIGS. 28 and 29.

Firstly, the mutual capacitance sensing will be described.

Figure 26:
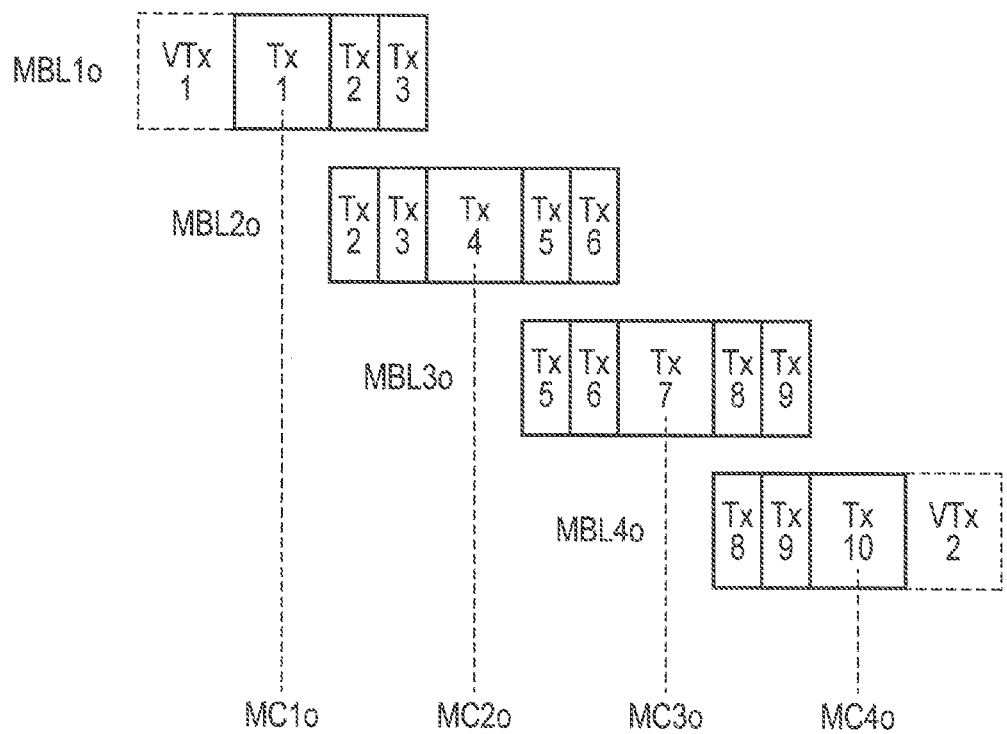
FIG. 26 is an explanatory diagram showing mutual capacitance sensing of the second embodiment.
Figure 27:
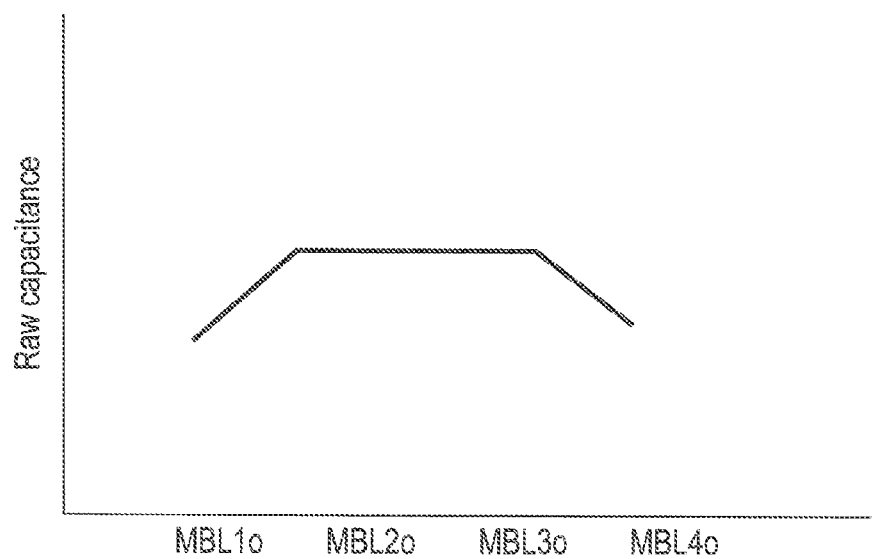
FIG. 27 is a diagram showing an example of the result of the mutual capacitance sensing of the second embodiment.

In the example shown in FIG. 26, it is assumed that the drive electrodes TX1 to TX3 constitute a block MBL1o, the drive electrodes TX2 to TX6 constitute a block MBL2o, the drive electrodes TX5 to TX9 constitute a block MBL3o, and the drive electrodes TX8 to TX10 constitute a block MBL4o. In this structure also, the driver IC3 drives the drive electrodes TX of the blocks MBL (first blocks) every five bundles (pitch 6W, first predetermined number) in such a way that the drive electrodes TX of one block MBL partially overlap the drive electrodes TX of another block MBL. Note that, regarding the sensing of the blocks MBL1o and MBL4o, since each of the blocks MBL1o and the MBL4o is composed of three bundles (pitch 4W), the driver IC3 uses a virtual drive electrode VTX1 of the pitch 2W for the block MBL1o and a virtual drive electrode VTX2 of the pitch 2W for the block MBL4o and processes each of the blocks MBL1o and MBL4o virtually as five bundles. Further, the positions MC1o to MC4o of the widthwise centers of the drive electrodes TX1, TX4, TX7 and TX10 indicate the positions of the centers of the blocks MBL1o to MBL4o, respectively.

The driver IC3 supplies the drive signal Stx to the block MBL1o and obtains the sensing results from the sensing electrodes RX. Subsequently, sensing is similarly executed with respect to the blocks MBL2o to MBL4o. FIG. 27 is a graph showing an example of the sensing results of the blocks MBL1o to MBL4o when the blocks MBL1o to MBL4o do not sense any object O. While the block MBL3o is composed of five bundles (pitch 6W), each of the blocks MBL1o and MBL4o is composed of three bundles (pitch 4W) and is processed virtually as five bundles together with each of the drive electrodes VTX1 and VTX2. Therefore, the capacitance to be actually sensed will be different from each other, and the raw capacitance of the blocks MBL1o and MBL4o will be less than the raw capacitance of the blocks MBL2o and MBL3o. In this way, the raw capacitance of the blocks MBL2o and the MBL3o and the raw capacitance of the blocks MBL1o and MBL4o are different from each other. In the example shown in FIG. 27, the raw capacitance of the blocks MBL1o and MBL4o is less than the raw capacitance of the blocks MBL2o and MBL3o. Although the raw capacitance is different from each other as described above, since the raw capacitance values are laterally symmetric, the driver IC3 can easily make raw capacitance corrections.

Next, the self capacitance sensing will be described.

Figure 28:
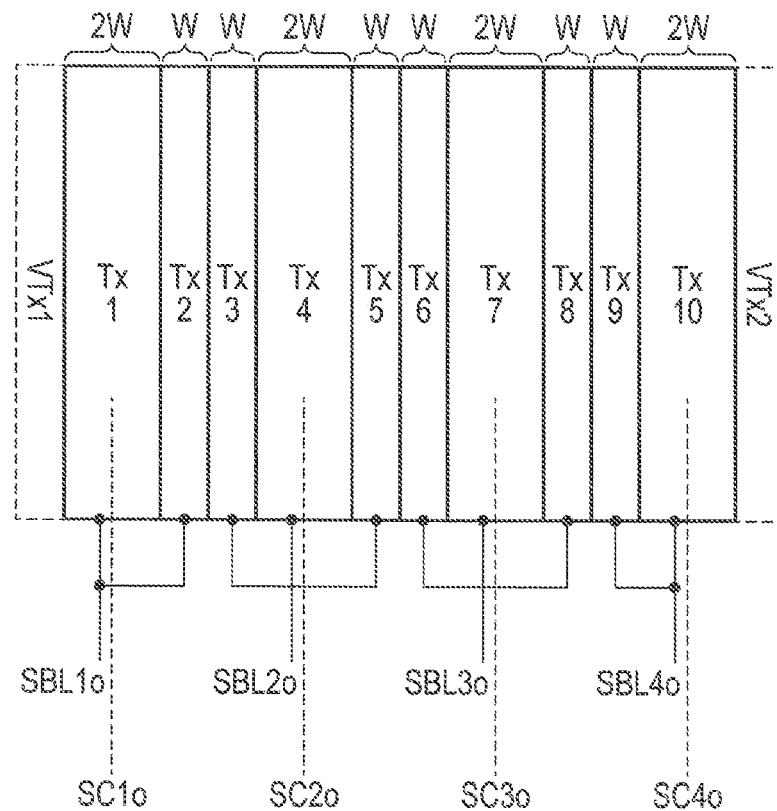
FIG. 28 is an explanatory diagram showing self capacitance sensing of the second embodiment.
Figure 29:
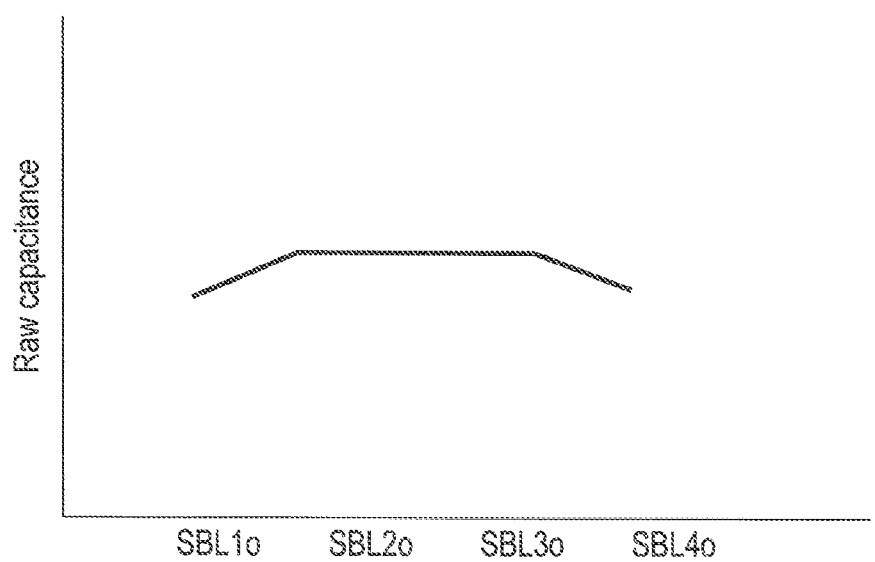
FIG. 29 is a diagram showing an example of the result of the self capacitance sensing of the second embodiment.

In the example shown in FIG. 28, it is assumed that the drive electrodes TX1 and TX2 constitute a block SBL1o, the drive electrodes TX3 to TX5 constitute a block SBL2o, the drive electrodes TX6 to TX8 constitute a block SBL3o, and the drive electrodes TX9 and TX10 constitute a block SBL4o. Note that each of the blocks SBL1o and SBL4o is composed of two bundles. Therefore, the driver IC3 uses virtual drive electrodes VTX1 and VTX2 of the pitch W and processes each of the blocks SBL1o to SBL4o (second blocks) virtually as three bundles (pitch 4W: second predetermined number). Further, the positions SC1o to SC4o of the widthwise centers of the drive electrodes TX1, TX4, TX7 and TX10 indicate the positions SC1o to SC4o of the centers of the blocks SBL1o to SBL4o, respectively. Therefore, as in the case with the structure of the even number of drive electrodes TX of the first embodiment, the positions MC1o to MC4o of the centers in the mutual capacitance sensing are aligned with the positions SC1o to SC4o of the centers in the self capacitance sensing, respectively.

The driver IC3 simultaneously obtains the sensing results of the blocks SBL1e to SBL4e. FIG. 29 is a graph showing an example of the sensing results of the blocks SBL1o to SBL4o when the blocks SBL1o to SBL4o do not sense any object O. While each of the blocks SBL2o and SBL3o is composed of three bundles (pitch 4W), each of the blocks SBL1o and SBL4o is composed of two bundles (pitch 3W) and is processed virtually as three bundles together with each of the virtual drive electrodes VTX1 and VTX2. Therefore, the capacitance to be actually sensed will be different from each other, and the raw capacitance of the blocks SBL2o and SBL3o and the raw capacitance of the block SBL1o and SBL4o will be different from each other. In the example shown in FIG. 29, the raw capacitance of the blocks SBL1o and SBL4o is less than the raw capacitance of the blocks SBL2o and SBL3o. Although the raw capacitance is different from each other as described above, since the raw capacitance values are laterally symmetric, the driver IC3 can easily make raw capacitance corrections.

As described above, as in the case with the structure of the first embodiment, the positions MC1o to MC4o of the centers in the mutual capacitance sensing are aligned with the positions SC1o to SC4o of the centers in the self capacitance sensing, respectively. Therefore, even when sensing is executed by two sensing methods in combination and if the object O contacts or approaches, a position where the object O is sensed by one sensing method will not be misaligned with a position where the object O is sensed by the other sensing method. Therefore, the driver IC3 can avoid making an error in sensing the object O and accurately sense the position of the object O.

As in the structure of the present embodiment, according to either the first arrangement pattern or the second arrangement pattern of the drive electrodes TX, the positions MC1e to MC4e or MC1o to MC4o of the centers in the mutual capacitance sensing are aligned with the positions SC1e to SC4e or SC1o to SC4o of the centers in the self capacitance sensing, respectively. Therefore, the driver IC3 can avoid making an error in sensing the object O and accurately sense the position of the object O.

Further, the capacitance ratio between a block with a virtual drive electrode VTX and a block without a virtual drive electrode VTX is less than that of the structural example, and thus the driver IC3 can make raw capacitance corrections more easily.

Next, as a structural example of a touch sensor TD which is incorporated into the display device 1 and executes sensing by the mutual capacitance sensing method and the self capacitance sensing method in combination, an example (second arrangement pattern) where the sum of the number of the drive electrodes TX of the pitch 2W and the number of the pairs of the drive electrodes TX of the pitch W is an odd number will be described.

As shown in FIG. 30, the touch sensor TD includes the drive electrodes TX1 to TX10, the driver IC3, the sensor circuit 4, a first selector circuit 30, a second selector circuit 40, and a controller circuit 50. The sensor circuit 4 includes a circuit (first sensor circuit) which senses the object O by the mutual capacitance sensing method and a circuit (second sensor circuit) which senses the object O by the self capacitance sensing method. Therefore, as described above, the sensor circuit 4 senses the output from the sensing electrodes RX (whose illustration is omitted in FIG. 30) with respect to the block MBL1o to MBL4o and outputs the sensing results to the driver IC3, and also senses the output from the sensing electrodes RX with respect to the block SBL1o to SBL4o and outputs the sensing results to the driver IC3. The selector circuit 30 includes switching units SW1 to SW10. The second selector circuit 40 includes switching units SW11 to SW20.

The switching units SW1 to SW10 are connected to the drive electrodes TX1 to TX10 and are also connected to the second selector circuit 40 via lead lines LB1 to LB10 and lead lines LA1 to LA10. The lead lines LB1 and LB2 which are connected respectively to the drive electrodes TX1 and TX2 are joined together in the first selector circuit 30 and connected to the second selector circuit 40, the lead lines LB3, LB4 and LB5 which are connected respectively to the drive electrodes TX3, TX4 and TX5 are joined together in the first selector circuit 30 and connected to the second selector circuit 40, the lead lines LB6, LB7 and LB8 which are connected respectively to the drive electrodes TX6, TX7 and TX8 are joined together in the first selector circuit 30 and connected to the second selector circuit 40, and the lead lines LB9 and LB10 which are connected respectively to the drive electrodes TX9 and TX10 are joined together in the first selector circuit 30 and connected to the second selector circuit 40.

The switching units SW1 to SW10 switch between a first state (on state) where the drive electrodes TX1 to TX10 are conductive respectively to the switching units SW11 to SW20 and a second state (off state) where the drive electrodes TX1 to TX10 are not conductive respectively to the switching units SW11 to SW20, and also switch between a third state (on state) where the drive electrodes TX1 to TX10 are conductive to the sensor circuit 4 and a fourth state (off state) where the drive electrodes TX1 to TX10 are not conductive to the sensor circuit 4. The switching units SW1 to SW10 are connected to the driver IC3 via a signal line SL15. The driver IC3 outputs a signal SELF_EN to the switching units SW1 to SW10 via the signal line SL15. When the signal SELF_EN is in an on state, to execute the self capacitance sensing, the connection states of the switching units SW1 to SW10 are switched to the second state and the third state. On the other hand, when the signal SELF_EN is an off state, to execute the mutual capacitance sensing, the connection states of the switching units SW1 to SW10 are switched to the first state and the fourth state.

The switching units SW11 to SW20 are connected respectively to the lead lines LA1 to LA10 and are also connected to the driver IC3 via voltage lines SL13 and 14. A common voltage VCOMD close to the ground potential is supplied via the voltage line SL13, and a predetermined common voltage TSVCOM (H) is supplied via the voltage line SL14. The switching units SW11 to SW20 switch the voltage to be supplied to the drive electrodes TX1 to TX10 via the lead lines LA1 to LA10 between the common voltage VCOMDC and the common voltage TSVCOM. It is possible to supply alternating voltage to the drive electrodes TX1 to TX10 by switching back and forth between the common voltage VCOMDC and the common voltage TSVCOM at high speed.

The controller circuit 50 includes gates G1 to G10 and shift registers S/R1 to S/R10. The gates G1 to G10 are connected to the switching units SW11 to SW20, and are also connected to the shift resisters S/R1 to S/R10 and a voltage line SL12.

The gates G1 to G10 compare the output from the shift registers S/R1 to S/R10 with a selection signal VCOMSEL which is supplied via the voltage line SL12, and switch the states of the switching units SW11 to SW20, respectively.

The shift registers S/R1 to S/R10 are connected respectively to the gates G1 to G10 and are also connected to a control line SL11. The control line SL11 is connected to the driver IC3. The driver IC3 supplies a start signal SDST and a clock signal SDCK to the shift registers S/R1 to S/R10 to cause the shift registers S/R1 to S/R10 to sequentially drive the blocks MBL1o, MBL2o, MBL3o and MBL4o.

Next, the mutual capacitance sensing will be described.

The driver IC3 supplies a control signal (first drive signal) to the controller circuit 50 via the control line SL11 to drive the block MBL1o (drive electrodes TX1, TX2 and TX3). Subsequently, the shift registers S/R1, S/R2 and S/R3 output signals to cause the switching units SW11, SW12 and SW13 to switch the supply voltage. At this time, since the signal SELF_EN is the off state, the lead lines LA to LA3 are in connection, while the lead lines LB1 to LB3 are not in connection. Then, the alternating voltage is supplied to the drive electrodes TX1 to TX3 which constitute the block MBL1o. Here, the sensor circuit 4 outputs the sensing results from the sensing electrodes RX1 to RXn to the driver IC3. The driver IC3 can execute the sensing of the object O with respect to the block MBL1o based on the sensing results.

Subsequently, the driver IC3 sequentially executes with respect to the blocks MBL2o to MBL4o, processing similar to the processing which has been executed with respect to the block MBL1o. In this way, the driver IC3 can execute the sensing of the object O with respect to the blocks MBL1o to MBL4o.

Next, the self capacitance sensing will be described.

In the self capacitance sensing, the driver IC3 sets the signal SELF_EN signal (second drive signal) to the on state. In this way, the signal SELF_EN signal which is supplied to the switching units SW1 to SW10 via the signal line SL15 is set to the on state. In the switching units SW1 to SW10, since the signal SELF_EN is in the on state, the lead lines LA1 to LA10 are not in connection, while the lead lines LB1 to LB10 are in connection. Accordingly, the sensor circuit 4 outputs the sensing results of the blocks SLB1o to SLB4o to the driver IC3, respectively. The driver IC3 can execute the sensing with respect to the blocks SBL1o to SBL4o based on the sensing results.

Figure 31:
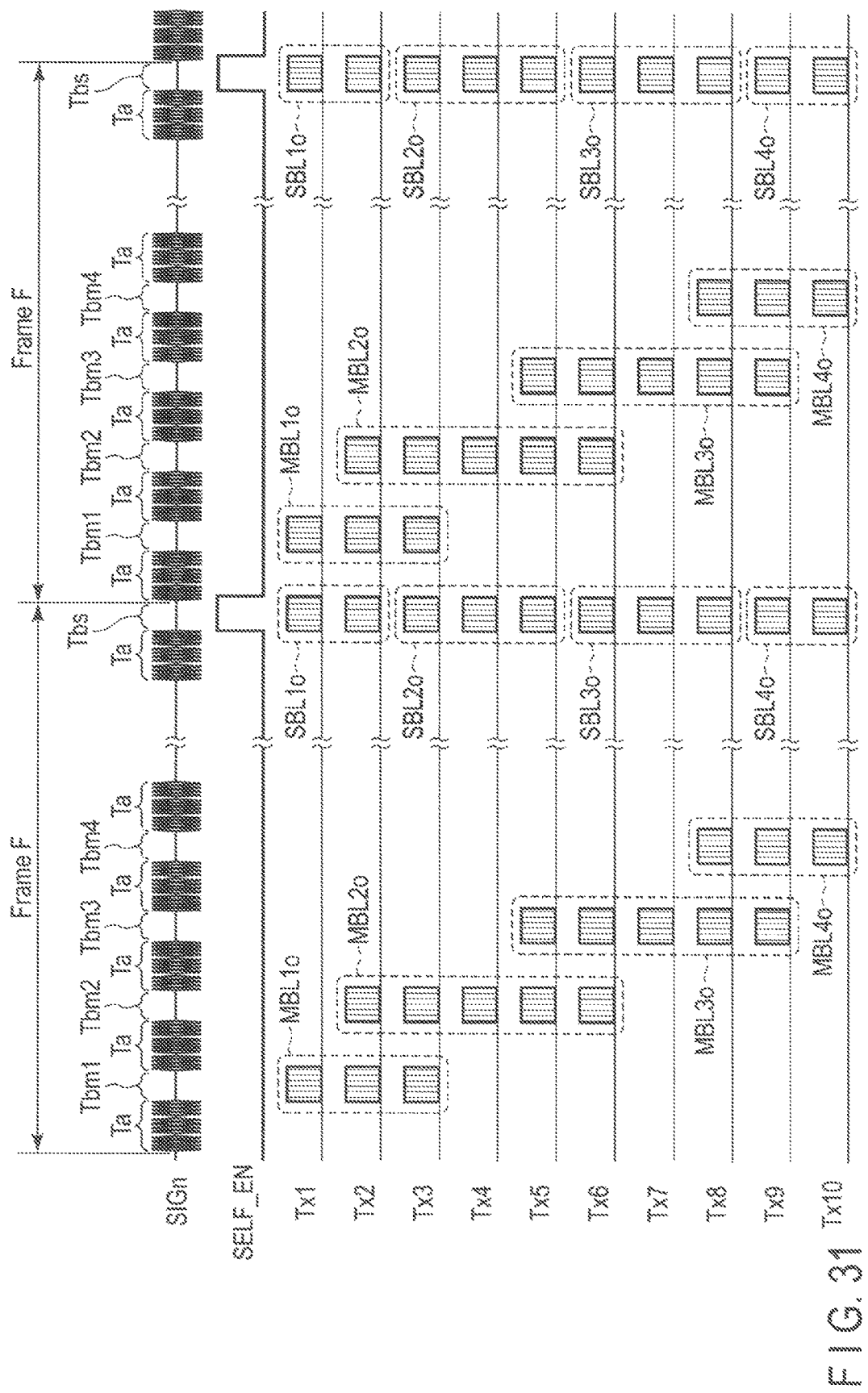
FIG. 31 is a timing chart showing an example of the sensing touch timing and the image display timing of the display device.

Next, the timing for the sensing and the timing for the image display of the driver IC3. FIG. 31 is a timing chart showing an example of the sensing timing and the image display timing frame F by frame F.

One frame F is composed of time periods Ta and time periods Tb. In the frame F, the cycle of the time period Ta and the time period Tb is repeated. Each of the time periods Ta indicates the timing for the image display, and each of the time periods Tb indicates the timing for the sensing (touch sensing). In each of the time periods Ta, a display signal SIGn is supplied to those among the signal lines S which correspond to each of the time periods Ta.

The time periods Tb includes time periods Tbm1 to Tmb4 and a time period Tbs. The driver IC3 executes the mutual capacitance sensing in the time periods Tbm1 to Tmb4 and the self capacitance sensing in the time period Tbs.

In the time periods Tb other than the time period Tbs, the signal SELF_EN is set to the off state. In the time period Tbm1, the driver IC3 executes the sensing by driving the block MBL1o (drive electrodes TX1 to TX3). In the time period Tbm2, the driver IC3 executes the sensing by driving the block MBL2o (drive electrodes TX2 to TX6). In the time period Tbm3, the driver IC3 executes the sensing by driving the block MBL3o (drive electrodes TX5 to TX9). In the time period Tbm4, the driver IC3 executes the sensing by driving the block MBL4o (drive electrodes TX8 to TX10).

In the time period Tbs, the driver IC3 sets the signal SELF_EN to the on state. In this way, the driver IC3 can execute the self capacitance sensing with respect to the blocks SBL1o to SBL4o. In the example shown in FIG. 31, the time period Tbs is the last time period Tb of the frame F. As the time period Tbs ends, the processing of the frame F ends, and the processing of the next frame F starts. Note that the time period Tbs may be the first time period Tb or any other time period Tb of the frame F. Further, although the time periods Tbm1 to Tmb4 are the first four time periods Tb of the frame F in the example shown in FIG. 31, the time periods Tbm1 to Tmb4 may be the last four time periods Tb or any other four time periods Tb of the frame F. Still further, one frame F may include several cycles of the time periods Tmb1 to Tmb4 and the time period Tbs.

As described above, the driver IC3 alternately executes the sensing and the image display. Therefore, drive noises which are produced in the driving in one processing will not have any impact on the driving in the other processing.

Further, in general, if the image display is continuously executed for a predetermined time, the sensing cannot be executed during that time, but since the sensing and the image display are alternately executed in the present embodiment, the non-executable time of the sensing can be significantly reduced.

Note that the touch sensor TD can be realized not only by the circuit configuration of the present embodiment but also by various other circuit configurations.

Further, since the drive electrodes TX are used for both the display and the sensing, there is no need to respectively provide electrodes for the display and electrodes for the sensing. In this way, the structure of the display device 1 can be simplified, and the size of the display device 1 can be reduced.

The structures of the drive electrodes TX and the sensing electrodes RX are not limited to those described herein with reference to FIG. 1 and the like. For example, the drive electrodes TX and the sensing electrodes RX may be formed in the shape of an island and may be alternately arranged in the first direction X and the second direction Y on the same plane. Further, the drive electrodes TX and the sensing electrodes RX are not necessarily formed of a transparent conductive material such as ITO or IZO. For example, the sensing electrodes RX may be formed of metal lines.

In the present embodiment, common electrodes used for the image display are used as the drive electrodes TX. However, the drive electrodes TX may be provided separately from the common electrodes. Still further, the touch sensor TD may be an independent device from the display device 1. As one structural example of the touch sensor TD, the drive electrodes TX may be formed on one surface of a transparent substrate, and the sensing electrodes RX may be formed on the other surface thereof.

(Another Embodiment)

Figure 32:
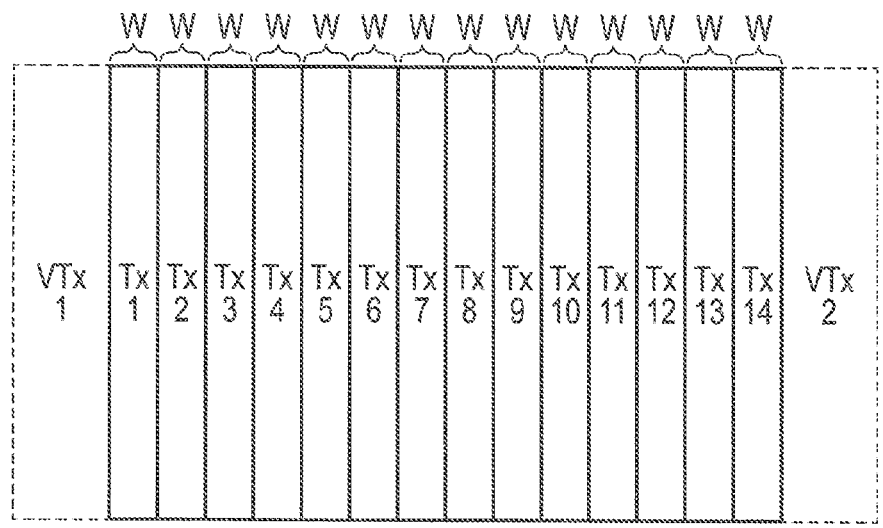
FIG. 32 is a diagram showing an example of the structure of drive electrodes of another embodiment.
Figure 33:
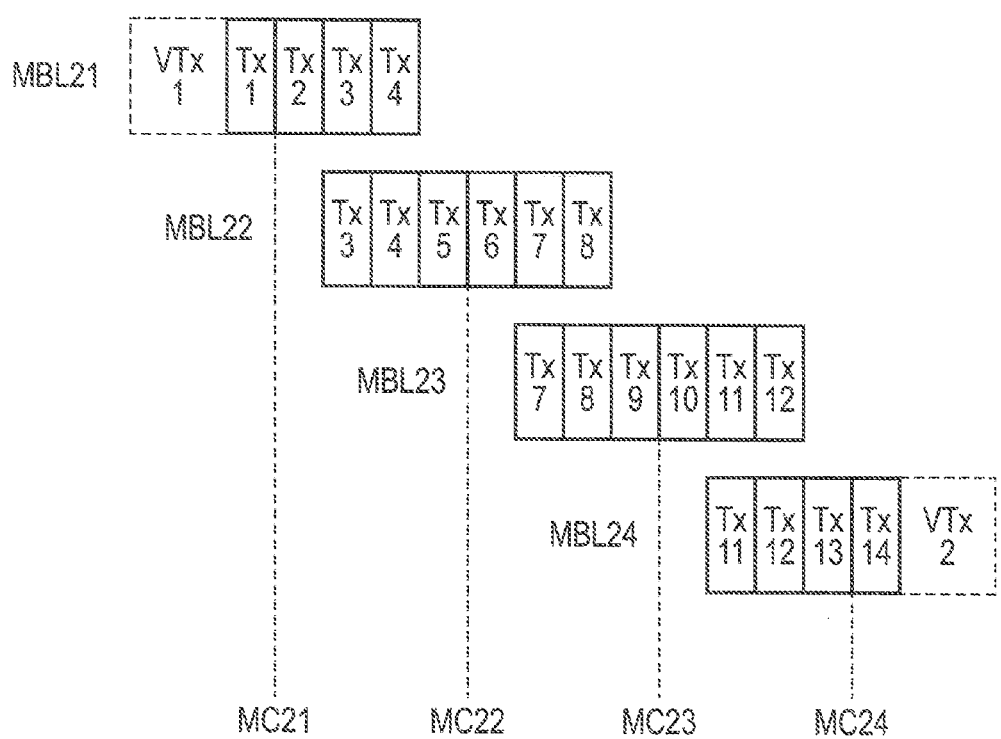
FIG. 33 is a diagram showing an example of the mutual capacitance sensing of the other embodiment.

Further, the example shown in FIGS. 32 to 34 is another structural example of dividing the drive electrodes TX. As shown in FIG. 32, the drive electrodes TX include the drive electrodes TX1 to TX14 of the pitch W (the same width). More specifically, this structure corresponds to the structure of the odd number of drive electrodes TX of the second embodiment, but in this structure, all the drive electrodes TX are divided in half.

In this structure of the drive electrodes TX, the mutual capacitance sensing thereof will be described with reference to FIG. 33. In the example shown in FIG. 33, it is assumed that the drive electrodes TX1 to TX4 constitute a block MBL21, the drive electrodes TX3 to TX8 constitute a block MBL22, the drive electrodes TX7 to TX12 constitute a block MBL23, and the drive electrodes TX11 to TX14 constitute a block MBL24. In this structure, the driver IC3 drives the drive electrodes TX of the blocks MBL every six bundles (pitch 6W) in such a way that the drive electrodes TX of one block MBL partially overlap the drive electrodes TX of another block MBL. Note that, since each of the blocks MBL21 and the MBL24 is composed of four bundles (pitch 4W), the driver IC3 uses a virtual drive electrode VTX1 of the pitch 2W for the block MBL21 and a virtual drive electrode VTX2 of the pitch 2W for the block MBL24 and processes each of the blocks MBL21 and MBL24 virtually as six bundles. Further, the positions MC21 to MC24 between the drive electrodes TX1 and TX2, the drive electrodes TX5 and TX6, the drive electrodes TX9 and TX10, and the drive electrodes TX13 and 14 indicate the positions of the centers of the blocks MBL21 to MBL24, respectively.

FIG. 34 shows an example of the self capacitance sensing. In the example shown in FIG. 34, it is assumed that the drive electrodes TX1 to TX3 constitute a block SBL21, the drive electrodes TX4 to TX7 constitute a block SBL22, the drive electrodes TX8 to TX11 constitute a block SBL23, and the drive electrodes TX12 and TX14 constitute a block SBL24. Note that, since each of the blocks SBL21 and SBL24 is composed of three bundles (pitch 3W), the driver IC3 uses each of virtual drive electrodes VTX1 and VTX2 of the pitch W and processes each of the blocks SBL21 and the SBL24 virtually as four bundles. Further, the positions SC21 to SC24 between the drive electrodes TX1 and TX2, the drive electrodes TX5 and TX6, the drive electrodes TX9 and TX10, and the drive electrodes TX13 and 14 indicate the positions of the centers of the blocks SBL21 to SBL24, respectively. Therefore, the positions MC21 to MC24 of the centers in the mutual capacitance sensing are aligned with the positions SC21 to SC24 of the centers in the self capacitance sensing, respectively. Therefore, the same advantage as that achieved from the second embodiment can also be achieved from the present embodiment.

Note that, although such a case as shown in FIG. 30 where the sensor circuit 4 executes the sensing by the two sensing methods, namely, the mutual capacitance sensing method and the self capacitance sensing method in combination has been described, this structure is in no way restrictive. It is also possible to realize as one chip by providing a sensor circuit conforming to the mutual capacitance sensing method and a sensor circuit conforming to the self capacitance sensing method inside the driver IC3. Further, the sensor circuit conforming to the mutual capacitance sensing method and the sensor circuit conforming to the self capacitance sensing method can be realized as separate chips.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

(Additional Notes)

(1) A touch sensor comprising: sensors; a driver which supplies a first drive signal which sequentially drives the sensors in first predetermined number units in such a way that sensors driven in one unit partially overlap sensors driven in another unit and a second drive signal which simultaneously drives the sensors in second predetermined number units; a first sensor circuit which senses an object in proximity to or in contact with a sensing area based on first sensing signals corresponding to the first drive signal; and a second sensor circuit which senses the object in proximity to or in contact with the sensing area based on second sensing signals corresponding to the second drive signal, wherein the sensors are divided into segments in such a way that the centers of the sensors which are sequentially driven in the first predetermined number units are aligned with the centers of the sensors which are driven in the second predetermined number units, respectively.

(2) The touch sensor of (1), wherein
the sensors have a predetermined width, and
the sensors which are divided into segments have half the predetermined width of the sensors.

(3) The touch sensor of (1), wherein the sensors have the same width as each other.

What is claimed is:

1. A display device comprising:
drive electrodes which are arranged side by side in a first direction;
sensing electrodes which produce capacitance between the drive electrodes and the sensing electrodes;
a driver which supplies either a first drive signal or a second drive signal to the drive electrodes;
a first sensor circuit which senses an object in contact with or in proximity to a sensing area based on first sensing signals which are obtained from the sensing electrodes in response to the first drive signal; and
a second sensor circuit which senses the object in contact with or in proximity to the sensing area based on second sensing signals which are obtained from the drive electrodes in response to the second drive signal,
wherein the drive electrodes include first drive electrodes and second drive electrodes,
wherein the second drive electrodes are arranged between the first drive electrodes which are adjacent to each other, and
wherein a first width of the first drive electrodes in the first direction is an integer multiple of a second width of the second drive electrodes in the first direction.

2. The display device of claim 1, wherein
the number of the second drive electrodes which are arranged between the adjacent first drive electrodes is two, and
the first width is twice the second width.

3. The display device of claim 2, wherein
the driver sequentially supplies the first drive signal to a plurality of first blocks of the drive electrodes, each of the first blocks including a first predetermined number of drive electrodes which are successively arranged in the first direction, and simultaneously supplies the second drive signal to a plurality of second blocks of the drive electrodes, each of the second blocks including a second predetermined number of drive electrodes which are successively arranged in the first direction, and
center lines of the first blocks in the first direction are aligned with center lines of the second blocks in the first direction, respectively.

4. The display device of claim 3, wherein the adjacent first blocks share the same second drive electrodes with each other.

5. A driving method of a display device comprising:
providing the display device including drive electrodes which are arranged side by side in a first direction; sensing electrodes which produce capacitance between the drive electrodes and the sensing electrodes; a driver which supplies either a first drive signal or a second drive signal to the drive electrodes; a first sensor circuit which senses an object in contact with or in proximity to a sensing area based on first sensing signals which are obtained from the sensing electrodes in response to the first drive signal; and a second sensor circuit which senses the object in contact with or in proximity to the sensing area based on second sensing signals which are obtained from the drive electrodes in response to the second drive signal, wherein the drive electrodes include first drive electrodes and second drive electrodes, wherein the second drive electrodes are arranged between the first drive electrodes which are adjacent to each other, and wherein a first width of the first drive electrodes in the first direction is an integer multiple of a second width of the second drive electrodes in the first direction;

sequentially supplying the first drive signal to a plurality of first blocks of the drive electrodes, each of the first blocks including a first predetermined number of drive electrodes which are successively arranged in the first direction;

simultaneously supplying the second drive signal to a plurality of second blocks of the drive electrodes, each of the second blocks including a second predetermined number of drive electrodes which are successively arranged in the first direction; and aligning center lines of the first blocks in the first direction with center lines of the second blocks in the first direction, respectively.

6. The driving method of claim 5, wherein the number of the second drive electrodes which are arranged between the adjacent first drive electrodes is two, and the first width is twice the second width.

7. The driving method of claim 6, wherein the adjacent first blocks share the same second drive electrodes with each other.

* * * * *